(12) United States Patent
Tsuruta

(10) Patent No.: US 6,988,151 B2
(45) Date of Patent: Jan. 17, 2006

(54) STORAGE CONTROL DEVICE WITH A PLURALITY OF CHANNEL CONTROL SECTIONS

(75) Inventor: Susumu Tsuruta, Odawara (JP)

(73) Assignee: Hitachi, Ltd., Tokyo (JP)

( * ) Notice: Subject to any disclaimer, the term of this patent is extended or adjusted under 35 U.S.C. 154(b) by 97 days.

(21) Appl. No.: 10/809,740

(22) Filed: Mar. 24, 2004

(65) Prior Publication Data

US 2005/0149645 A1    Jul. 7, 2005

(30) Foreign Application Priority Data

Jan. 6, 2004    (JP)    ............................. 2004-001443

(51) Int. Cl.
*G06F 13/16*    (2006.01)
*G06F 12/02*    (2006.01)

(52) U.S. Cl. ........................ 710/36; 711/148; 711/209; 710/38; 710/33

(58) Field of Classification Search ................. 710/36, 710/38, 33; 711/148, 209
See application file for complete search history.

(56) References Cited

U.S. PATENT DOCUMENTS

| | | | |
|---|---|---|---|
| 5,434,976 A * | 7/1995 | Tan et al. .................... | 709/234 |
| 5,548,791 A * | 8/1996 | Casper et al. ................. | 710/38 |
| 5,640,596 A * | 6/1997 | Takamoto et al. ............ | 710/21 |
| 5,878,203 A | 3/1999 | Matsumoto et al. | |
| 5,920,893 A | 7/1999 | Nakayama et al. | |
| 6,606,715 B1 | 8/2003 | Kikuchi | |
| 2002/0124140 A1 | 9/2002 | Kawaguchi et al. | |
| 2003/0131192 A1 | 7/2003 | Nakamura et al. | |
| 2003/0158980 A1 | 8/2003 | Mizuno | |
| 2004/0123026 A1 | 6/2004 | Kaneko | |
| 2004/0123028 A1 | 6/2004 | Kanai et al. | |
| 2004/0128453 A1 | 7/2004 | Ido et al. | |

(Continued)

FOREIGN PATENT DOCUMENTS

| EP | 0550164 A1 * | 7/1993 |
|---|---|---|
| WO | WO 92/01988 | 2/1992 |

OTHER PUBLICATIONS

"Intelligent Storage Controller PCI RAID Adapter Card," Intel Corporation Santa Clara, CA, no date.

*Primary Examiner*—B. James Peikari
(74) *Attorney, Agent, or Firm*—Townsend and Townsend and Crew LLP

(57) ABSTRACT

A storage control device provided with a plurality of channel control sections for receiving data input and output requests from an information processing device and transmitting and receiving data, to and from an information processing device, each of the plurality of channel control sections comprising: an input/output control section for receiving data input and output requests from the information processing device and controlling transmission and reception of data between a data storage memory and the information processing device; a processor; a data storage memory; and a data transfer device for transferring data in the data storage memory to a cache memory; and in a first channel control section of the plurality of channel control sections, the processor manages the data storage space in the data storage memory, and in a second channel control section, the input/output control section manages the data storage space in the data storage memory, and reports information relating to the data storage space to the processor.

10 Claims, 25 Drawing Sheets

U.S. PATENT DOCUMENTS

| | | |
|---|---|---|
| 2004/0143688 A1 | 7/2004 | Sugimoto |
| 2004/0148329 A1 | 7/2004 | Ogasawara et al. |
| 2004/0148484 A1 | 7/2004 | Watanabe et al. |
| 2004/0153721 A1 | 8/2004 | Fujimoto |
| 2004/0153740 A1 | 8/2004 | Fujimoto |
| 2004/0172510 A1 | 9/2004 | Nagashima et al. |

* cited by examiner

STORAGE CONTROL DEVICE WITH A PLURALITY OF CHANNEL CONTROL SECTIONS

CROSS-REFERENCES TO RELATED APPLICATIONS

This application relates to and claims priority from Japanese Patent Application No. 2004-001443, filed on Jan. 6, 2004, the entire disclosure of which is incorporated herein by reference.

BACKGROUND OF THE INVENTION

1. Field of the Invention

The present invention relates to an storage control device.

2. Description of the Related Art

With the advance of information technology in recent years, the storage capacity of storage devices has been increasing steadily. Technology has been developed for connecting a storage device having large capacity of this kind to a plurality of information processing devices, in a communicable fashion, thus allowing the large-capacity storage resources provided by the storage device to be used by the plurality of information processing devices. In this case, technology has also be developed for using the storage resources of the storage device by means of a mixture of open information processing devices and mainframe information processing devices.

Reference Patent 1: Japanese Patent Laid-open No. (Hei) 9-325905

However, when using open information processing devices and mainframe information processing devices, there are differences in the characteristics demanded of the storage device, in that in the case of open devices, the emphasis tends to be placed on relative cost, whereas in the case of mainframe devices, the emphasis tends to be placed on relative performance.

Therefore, a storage device is sought which is capable of responding flexibly to both of these demands.

SUMMARY OF THE INVENTION

The present invention was devised with the foregoing in view, the principal object thereof being to provide a storage control device.

In order to achieve the aforementioned object, the present invention relates to a storage control device comprising: a first channel control section for receiving data input and output requests from a first information processing device, and transmitting and receiving data, to and from the first information processing device; a second channel control section for receiving data input and output requests from a second information processing device, and transmitting and receiving data, to and from the second information processing device; a disk control section for reading and writing data, from and to a storage volume storing data, in accordance with the data input and output requests; and a cache memory for storing data transmitted and received between the first channel control section, the second channel control section and the disk control section; wherein the first channel control section comprises: a first memory; a first input/output control section for receiving data input and output requests from the first information processing device and controlling transmission and reception of data between the first memory and the first information processing device; a first processor for controlling the first memory and the cache memory; and a first data transfer device having a first memory controller for reading and writing data from and to the first memory, and a first data transfer control section for controlling data transfer between the first memory and the cache memory; and the second channel control section comprises: a second memory; a second input/output control section for controlling the second memory, receiving data input and output requests from the second information processing device and controlling transmission and reception of data between the second memory and the second information processing device; a second processor for controlling the cache memory; a second data transfer device having a second memory controller for reading and writing data from and to the second memory, and a second data transfer control section for controlling data transfer between the second memory and the cache memory; and in the first channel control section; in cases where the data input or output request received by the first input/output control section from the first information processing device is a first data write request; the first input/output control section transmits the first data write request to the first processor; the first processor transmits first storage position information containing information indicating a storage position in the first memory for the first write data transmitted by the first information processing device, to the first input/output control section; the first input/output control section starts to transmit information indicating the storage position in the first memory for the first write data, and the first write data, to the first memory controller; the first memory controller starts to write the first write data into the first memory; the first processor transmits first data transfer information containing information indicating the storage position in the first memory of the first write data, and information indicating a storage position in the cache memory for the first write data, to the first data transfer control section; the first data transfer control section transmits a read request for the first write data written to the first memory, to the first memory controller, on the basis of the first data transfer information; the first memory controller starts to read out the first write data from the first memory; and the first data transfer control section starts to transfer the first write data read out from the first memory, to the cache memory; and in the second channel control section; in cases where the data input and output request received by the second input/output control section from the second information processing device is a second data write request; the second input/output control section starts to transmit information indicating a storage position in the second memory for the second write data transmitted by the second information processing device, and the second write data, to the second memory controller; the second memory controller starts to write the second write data into the second memory; the second input/output control section transmits second storage position information containing information indicating the storage position in the second memory for the second write data, to the second processor; the second processor transmits second data transfer information containing information indicating the storage position in the second memory of the second write data, and information indicating a storage position in the cache memory for the second write data, to the second data transfer control section; the second data transfer control section transmits a read request for the second write data written to the second memory, to the second memory controller, on the basis of the second data transfer information; the second memory controller starts to read out the second write data from the second memory; and the second data transfer control section starts to transfer the second write data read out from the second memory, to the cache memory.

Other objects disclosed by the present application and method for resolving same will become apparent from the description of the preferred embodiments of the invention, and the drawings.

An storage control device can be provided.

DESCRIPTION OF THE PREFERRED EMBODIMENTS

Example of General Composition

Figure 1:
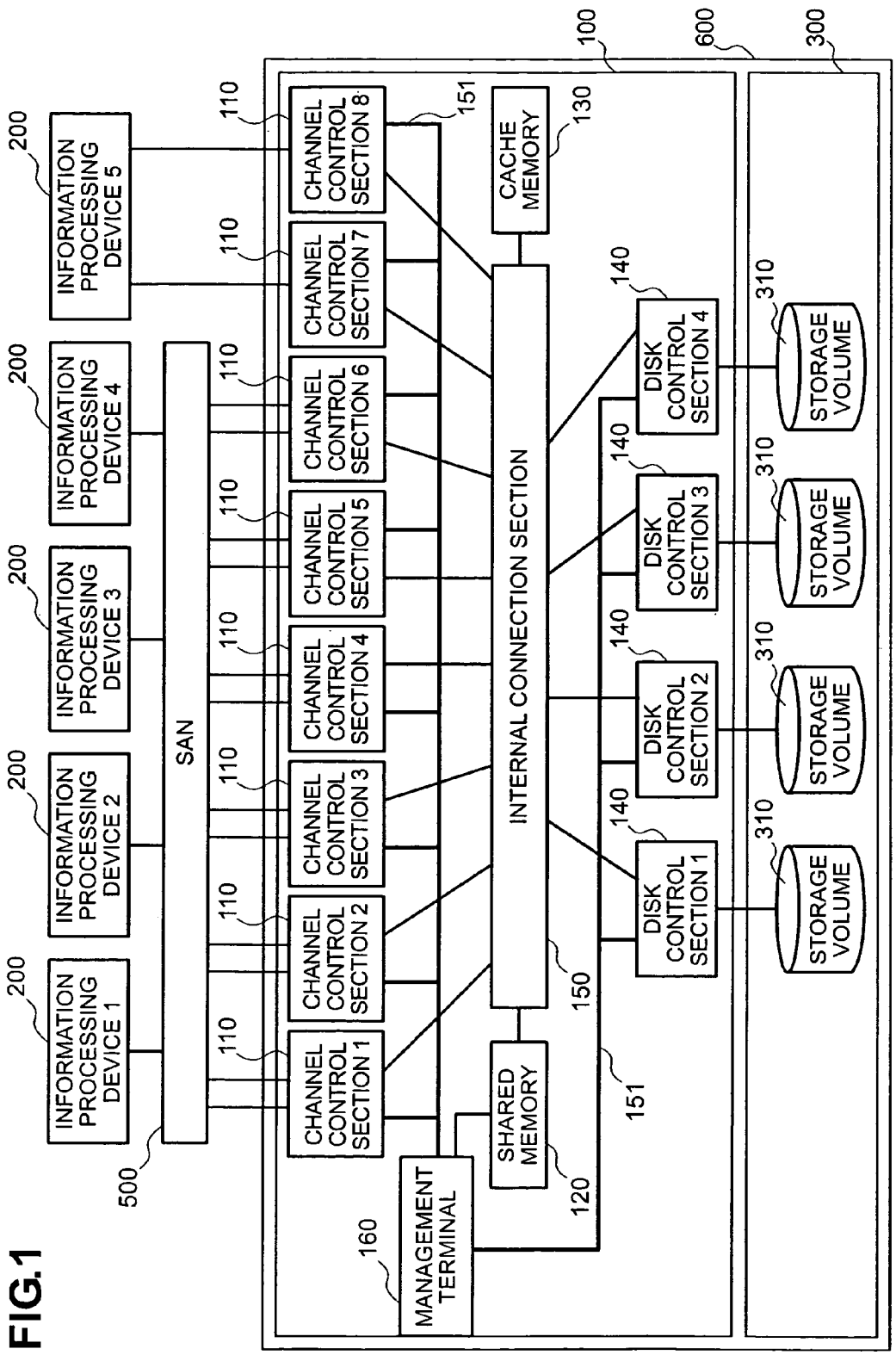
FIG. 1 is a block diagram showing the general composition of a storage system relating to the present embodiment.

Firstly, FIG. 1 shows a block diagram illustrating the general composition of a storage system 600 comprising a storage control device 100 relating to the present embodiment.

The storage system 600 comprises a storage control device 100 and a storage drive device 300. The storage control device 100 controls the storage drive device 300 in accordance with commands received from information processing devices 1 to 5 (200), for example. For example, it receives data input and output requests from the information processing devices 1–5 (200) and reads and writes data from and to storage volumes 310 provided in the storage drive device 300.

The information processing devices 1–5 (200) are information machines, such as computers, or the like, provided with a CPU (Central Processing Unit) and a memory. Various functions are achieved by means of various programs being executed by the CPUs provided in the information processing devices 1–5 (200). The information processing devices 1–5 (200) are used, for example, as kernel computers in automatic bank deposit and payment systems, airline seat reservation systems, and the like.

The information processing devices 1–4 (200) can be taken to be open computers (open information processing devices), such as personal computers, work stations, or the like, for example. Furthermore, the information processing device 5 (200) can be taken to be a mainframe computer (mainframe information processing device). In the mainframe computer, mainframe type application programs are executed under the control performed by a mainframe type operating system. Mainframe computers are often used in computer systems executing application programs where high performance is the principal requirement. Therefore, the storage control device 100 and storage drive device 300 connected to the mainframe computer are required to carry out data input and output processing in a short period of time, in response to data input and output requests from the mainframe computer. On the other hand, open computers are manufactured in accordance with publicly known technical specifications, and they are characterized in that, provided that the specifications are matching, it is possible to connect together machines made by different manufacturers. In an open computer, open type application programs are executed under control performed by an open type operating system. In comparison to mainframe computers, in the case of open computers, the emphasis tends to be placed on reducing costs by using common components, and the like, whilst relatively minor importance is attached to achieving high performance.

In FIG. 1, the information processing devices 1–4 (200) are connected in a communicable fashion with the storage control device 100, by means of a SAN (Storage Area Network) 500. The SAN 500 is a network for carrying out data input and output requests and data transfer and reception, between the storage control device 100 and the information processing devices 1–4 (200). Communications between the information processing devices 1–4 (200) and the storage control device 100 carried out via the SAN 500 can be performed in accordance with a fiber channel protocol, for example. In this case, data is transmitted and received between the information processing devices 1–4 (200) and the storage control device 100 in units of 2 kB (kilobyte) data blocks. For example, if 10 kB of write data is to be transmitted from the information processing devices 1–4 (200) to the storage control device 100, then this write data is divided into respective 2 kB blocks of data and then transmitted. The storage control device 100 is connected to a plurality of information processing devices 1–4 (200) via the SAN 500, and therefore it receives a mixture of data input and output requests and data blocks from the respective information processing devices 1–4 (200). Naturally, the information processing devices 1–4 (200) and the storage control device 100 do not have to be connected by means of a SAN 500, and they may also be connected by means of a LAN (Local Area Network), for example.

The information processing device 5 (200) is connected to the storage control device 100, without passing via a network, such as the SAN 500. The communications between the information processing device 5 (200) and the storage control device 100 can be carried out in accordance with a communications protocol such as FICON (Fiber Connection) (registered trademark), ESCON (Enterprise System Connection) (registered trademark), ACONARC (Advanced Connection Architecture) (registered trademark), FIBARC (Fiber Connection Architecture) (registered trademark), or the like, for example. Data input and output requests and data transmission and reception are carried out between the information processing device 5 (200) and the storage control device 100 in accordance with these communications protocols. In this case, data is transmitted and received between the information processing device 5 (200) and the storage control device 100 in units of prescribed data blocks. Of course, the information processing device 5 (200) and the storage control device 100 may be connected together by means of the SAN 500, and communications between same may be carried out in accordance with a fiber channel protocol.

Storage Drive Device

The storage drive device 300 comprises a plurality of physical disk drives for storing data. In this way, it is possible to provide a storage region having a large capacity to the information processing devices 1–5 (200). The physical disk drive may be constituted by data storage media, such as hard disk drives, or the like, or by a plurality of hard disk drives forming RAID (Redundant Arrays of Inexpensive Disks). Furthermore, it is also possible to establish logical volumes, which are logical storage regions, in the physical volumes, which are physical storage regions, provided by the physical disk drives. The storage regions for storing data, including both physical volumes and logical volumes, are jointly called "storage volumes" 310.

The storage control device 100 and the storage drive device 300 can be connected together directly according to the mode illustrated in FIG. 1, or they may be connected by means of a network. Moreover, the storage drive device 300 may also be constituted in an integral fashion with respect to the storage control device 100.

Storage Control Device

The storage control device 100 comprises channel control sections 110, a shared memory 120, a cache memory 130, disk control sections 140, a management terminal 160, and an internal connection section 150.

The storage control device 100 performs communications with the information processing devices 1–4 (200), via the SAN 500, by means of the channel control sections 1–6 (110). Furthermore, it performs communications with the information processing device 5 (200) by means of the channel control sections 7 and 8 (110).

Each channel control section 110 is provided with a communications interface for performing communications with the information processing devices 200, and it receives data input and output requests from the information processing devices 200 and transmits and receives data, to and from the information processing devices.

Each channel control section 110 is connected to an internal LAN 151, as is the management terminal 160. Thereby, it is possible to transmit and install micro programs, and the like, to be executed by the channel control sections 110, from the management terminal 160. The composition of the channel control sections 110 is described hereinafter.

The internal connection section 150 provides a mutual connection between the channel control sections 110, the shared memory 120, the cache memory 130, and the disk control sections 140. Data and commands are transmitted and received between the channel control sections 110, the shared memory 120, the cache memory 130, and the disk control sections 140, by means of the internal connection section 150. The internal connection section 150 is constituted by crossbar switches, for example.

The shared memory 120 and the cache memory 130 are memories for storing data that is transmitted and received between the channel control sections 110 and the disk control sections 140. The shared memory 120 is used principally to store control information, commands, and the like, whereas the cache memory 130 is used principally to store data.

For example, if the data input/output request received by a certain channel control section 110 from an information processing device 200 is a data write request, then the channel control section 110 in question writes the data write request to the shared memory 120, and furthermore, writes the write data received from the information processing device 200 to the cache memory 130. The disk control sections 140, on the other hand, monitor the shared memory 120, and if they detect that a data write request has been written to the shared memory 120, then they read out the write data from the cache memory 130, in accordance with this data write request, and write the data to the storage drive device 300.

Furthermore, if the data input/output request received by a certain channel control section 110 from an information processing device 200 is a data read request, then it investigates whether or not the read data that is to be read out is present in the cache memory 130. Here, if the data is present in the cache memory 130, then the channel control section 110 transmits this read data to the information processing device 200. On the other hand, if the read data is not present in the cache memory 130, then the channel control section 110 writes the data read request to the shared memory 120, and furthermore, it monitors the shared memory 120. A disk control section 140 having detected that a data read request has been written to the shared memory 120 reads out the read out to be read out, from the storage drive device 300, and writes this data to the cache memory 130, whilst also writing a notification to this effect, to the shared memory 120. The channel control section 110, upon detecting that the read data that was to be read out has been written to the cache memory 130, transmits this read data to the information processing device 200.

In this way, data is transmitted and received between the channel control sections 110 and the disk control sections 140, by means of the cache memory 130.

Besides a composition in which data write and read instructions are transmitted indirectly from the channel control sections 110 to the disk control sections 140, by means of the shared memory 120, it is also possible to adopt a composition wherein, for example, data write and read instructions are transmitted directly from the channel control sections 110 to the disk control sections 140, without passing through the shared memory 120.

Furthermore, the channel control sections 110 and the disk control sections 140 may be constituted in an integral fashion, in such a manner that control sections incorporating both functions are provided.

The disk control sections 140 are each connected in a communicable fashion to a storage volume 310 which stores data, and perform control of storage drive device 300. For example, as described above, a channel control section 110 writes and reads data, to and from, a storage volume 310, in response to data input/output requests received from an information processing device 200.

The respective disk control sections 140 are connected to an internal LAN 151, as is the management terminal 160, such that mutual communications therebetween are possible. Thereby, it is possible to transmit and install micro programs, and the like, to be executed by the disk control sections 140, from the management terminal 160. The composition of the disk control sections 140 is described hereinafter.

In the present embodiment, a case is described wherein a shared memory 120 and cache memory 130 are provided independently with respect to the channel control sections 110 and the disk control sections 140, but the present embodiment is not limited to this case. For example, it would also be desirable for the shared memory 120 and the cache memory 130 to be provided in a distributed fashion in each of the respective channel control sections 110 and disk control sections 140. In this case, the internal connection section 150 provides mutual connection between the channel control sections 110 and disk control sections 140 having distributed shared memories 120 or cache memories 130.

Furthermore, it is also possible to constitute at least some elements of the channel control sections 110, disk control sections 140, internal connection section 150, shared memory 120, and cache memory 130, in an integrated fashion.

Management Terminal

The management terminal 160 is an information machine for maintaining and managing the storage system 600. By operating the management terminal 160, the operator is able, for example, to set up the composition of the physical disk drives in the storage drive device 300, to set up the paths, which are the communications routes between the information processing devices 200 and the channel control sections 110, to set up the storage volumes 310, and to install micro programs to be executed by the channel control sections 110 and disk control sections 140, or the like. These types of settings and controls can be carried out via a user interface provided in the management terminal 160, or via a user interface in the information processing devices 1–5 (200) which display a Web page provided by a Web server operated by the management terminal 160.

A mode may be adopted wherein the management terminal 160 is built into the storage control device 100, or a mode may be adopted wherein it is fitted externally. Furthermore, the management terminal 160 may be a computer which is dedicated to maintaining and managing the storage control device 100 and storage drive device 300, or it may be a generic computer assigned with maintaining and managing functions.

Figure 4:
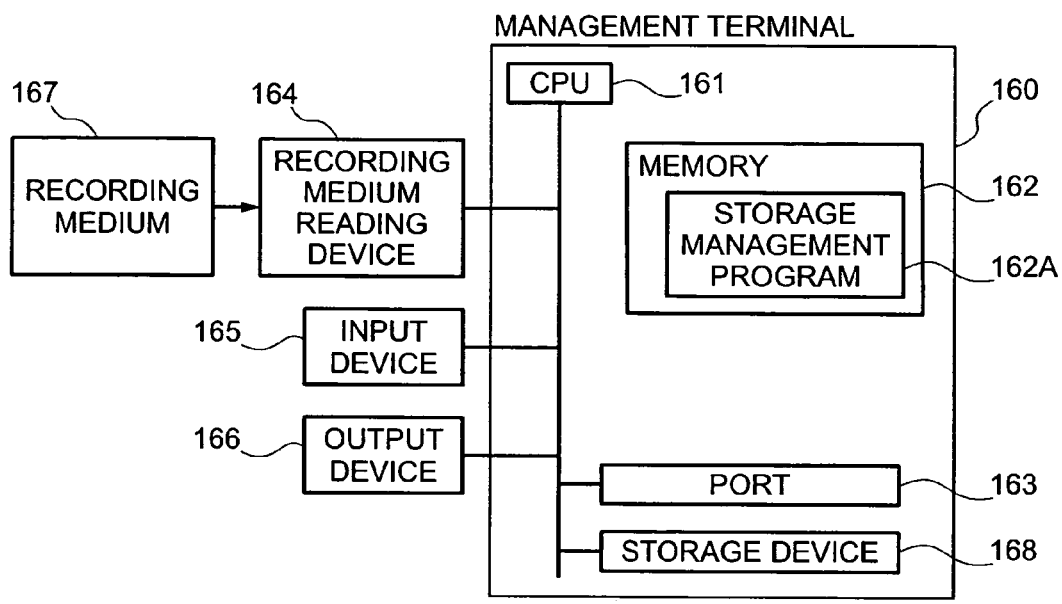
FIG. 4 is a block diagram showing the composition of a management terminals relating to the present embodiment.

FIG. 4 is a block diagram showing the composition of the management terminal 160.

The management terminal 160 comprises a CPU 161, a memory 162, a port 163, a recording medium reading device 164, an input device 165, an output device 166, and a storage device 168.

The CPU 161 performs overall control of the management terminal 160, and by executing a storage management program 162A constituted by code for carrying out various operations stored in the memory 162, it is possible to provide maintenance and management functions for the storage system 600. Moreover, in a similar manner, for example, by executing a storage management program 162A, it is possible to achieve the aforementioned Web server functions, and the like.

The recording medium reading device 164 is a device for reading out programs, data, and the like, recorded on a recording medium 167. The programs and data read out in this fashion are stored in the memory 162 and the storage device 168. Consequently, for example, it is possible to read out a storage management program 162A recorded on the recording medium 167, from the recording medium 167, by means of the recording medium reading device 164, and to store same in the memory 162 and storage device 168. A flexible disk, CD-ROM, semiconductor memory, or the like, may be used as the recording medium 167. A mode may be adopted wherein the recording medium reading device 164 is built into the management terminal 160, or a mode may be adopted wherein it is fitted externally. The storage device 168 is, for example, a hard disk device, a semiconductor storage device, or the like. The input device 165 is a user interface used by an operator, or the like, to input data to the management terminal 160, or the like. A keyboard, mouse, or the like, may be used as an input device 165. The output device 166 is a user interface used for outputting information externally. A display, printer, or the like, may be used as an output device 166. The port 163 is connected to the internal LAN 151, whereby the management terminal 160 is able to perform communications with the channel control sections 110 and the disk control sections 140, and the like. Furthermore, the port 163 may also be connected in a communicable fashion to a LAN, or the like, for example. In this case, it is also possible to connect the management terminal 160 to the information processing devices 1–5 (200), by means of the LAN.

External Appearance

Figure 2:
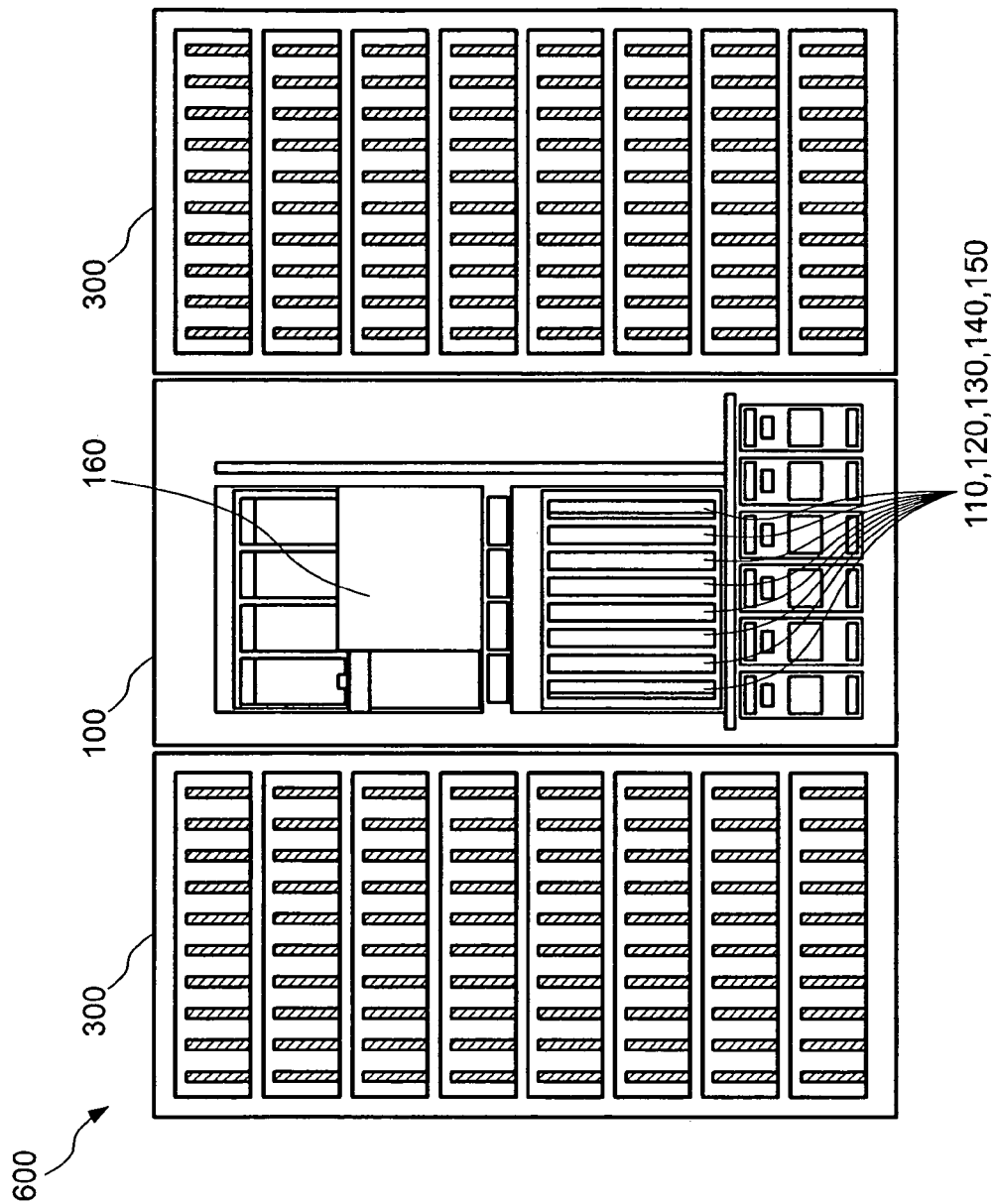
FIG. 2 is a diagram showing the external composition of a storage system relating to the present embodiment.
Figure 3:
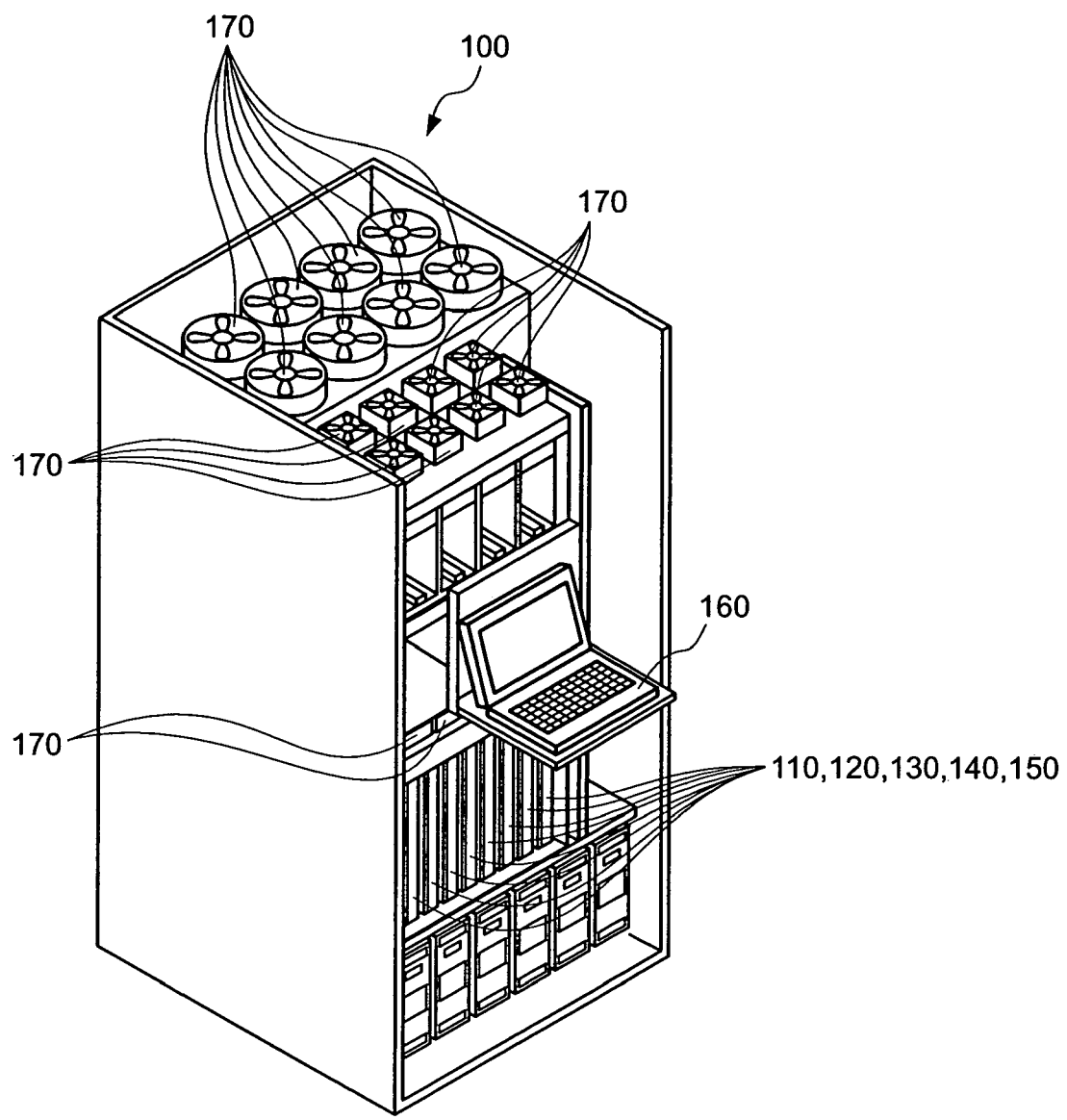
FIG. 3 is a diagram showing the external composition of a storage control device relating to the present embodiment.

Next, the external composition of the storage system 600 relating to the present embodiment is illustrated in FIG. 2. Furthermore, the external composition of the storage control device 100 is illustrated in FIG. 3.

As shown in FIG. 2, the storage system 600 relating to the present embodiment has a configuration wherein a storage control device 100 and storage drive device 300 are accommodated inside respective frames. In the example shown in FIG. 2, frames of the storage drive device 300 are situated on either side of the frame of the storage control device 100.

In the storage control device 100, the management terminal 160 is disposed in a central position on the front side. The management terminal 160 is covered by a cover, and as shown in FIG. 3, it is possible to use the management terminal 160 by opening the cover. The management terminal 160 illustrated in FIG. 3 is in the form of a so-called "notebook"-type personal computer, but it may take any form.

Slots for installing the channel control sections 110 and disk control sections 140, the cache memory 130, the shared memory 120 and the internal connection section 150 are provided below the management terminal 160. The channel control sections 110, disk control sections 140, cache memory 130, shared memory 120 and internal connection section 150 are provided on circuit substrates and hence composed in the form of boards, these boards being fitted into the respective slots. Guide rails for installing these boards are provided in the respective slots. The channel control sections 110, disk control sections 140, cache memory 130, shared memory 120 and internal connection section 150 can be installed in the storage control device 100, by inserting the respective boards into the slots, along the guide rails. Connectors for electrically connecting each of the boards to the storage control device 100 are provided on the front face of the rear part of each respective slot.

Furthermore, a fan 170 for expelling the heat generated by the channel control sections 110, and the like, is provided in the storage control device 100. The fan 170 may be provided in the upper face of the storage control device 100, or it may also be provided over the slots.

Channel Control Sections

Figure 5:
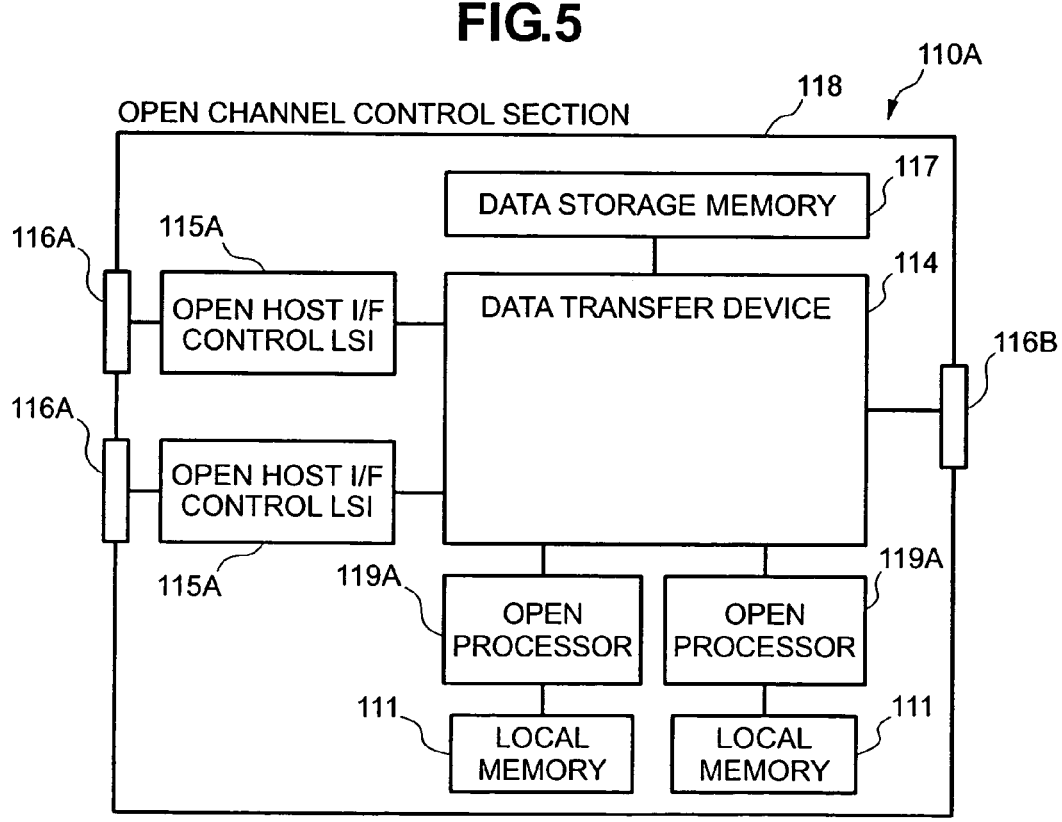
FIG. 5 is a block diagram showing the a channel control section relating to the present embodiment.
Figure 27:
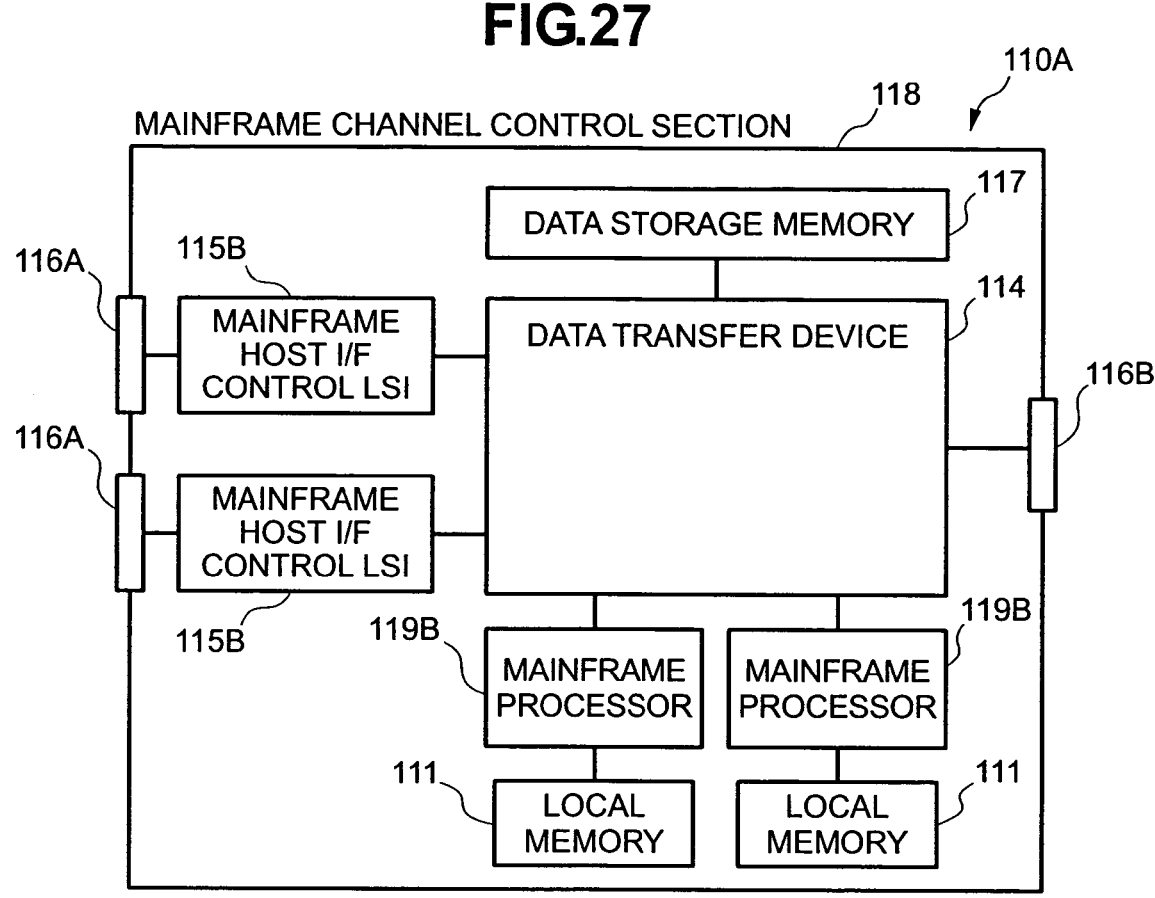
FIG. 27 is a block diagram showing a channel control section relating to the present embodiment.

The composition of a channel control section 110 is illustrated in FIG. 5 and FIG. 27. The channel control section illustrated in FIG. 5 is an open channel control section 110A, and the channel control section illustrated in FIG. 27 is a mainframe channel control section 110B. The open channel control section 110A receives data input/output requests from an open information processing device 200, and transmits and receives data, to and from an open information processing device 200. For example, it is one of the channel control sections 1–6 (110A) shown in FIG. 1. The mainframe channel control section 110B receives data input/output requests from a mainframe information processing device 200, and transmits and receives data, to and from a mainframe information processing device 200. For example, it is one of the channel control sections 7–8 (110B) shown in FIG. 1. Where there is no need to distinguish between an open channel control section 110A and a mainframe channel control section 110B, reference is made simply to a "channel control section 110".

The open channel control section 110A is constituted in the form of a board, comprising a single unit having a circuit board 118. The open channel control section 110A may comprise one or a plurality of circuit boards 118. On the circuit board 118, there are formed: open processors 119A, open host I/F control LSIs (host interface control Large Scale Integration, input and output control section) 115A, a data transfer device 114, a data storage memory (memory) 117, local memories 111, and connectors 116.

The open host I/F control LSIs 115A provides communications interface functions for performing communications with an open information processing device 200, and they receive data input/output requests from the open information processing device 200, and control the transmission and reception of data between the data storage memory 117 and the open information processing device 200. The connectors 116A which are connected to the open host I/F control LSIs 115A constitute communications ports which are connected in a communicable fashion to the open information processing device 200.

The open processors 119A control the data storage memory 117 and the cache memory 130. In other words, the open processors 119 control the storage position in the cache memory 130 and the data storage memory 117 of data transmitted to and received from the open information processing device 200 by the open host I/F control LSIs 115A.

The data storage memory 117 is a memory for storing data transmitted to and received from the open information processing device 200, by the open channel control section 110A. For example, if an open host I/F control LSI 115A has received write data from the open information processing device 200, then this write data is temporarily written to a storage position in the data storage memory 117 indicated by the open processor 119A. This write data is then transferred to the cache memory 130 by means of the data transfer device 114.

In this case, the write data transmitted by the open information processing device 200 is transmitted by being divided into prescribed data blocks, as described previously. When the write data transmitted by the open information processing device 200 is transferred to the cache memory 130, better data transfer efficiency is obtained if these data blocks are bundled together for transfer, to a certain degree, since this makes it possible to reduce the number of data transfer operations required. The open processor 119A decides how many data blocks should be bundled together for transfer, and indicates this decision to the data transfer device 114.

The data transfer device 114 controls the transfer of data between the data storage memory 117 and the cache memory 130, in accordance with instructions from the open processor 119A. Further details are described hereinafter, but the data transfer device 114 has a memory controller 840 for reading and writing data, from and to the data storage memory 117, and one or a plurality of DMA (Direct Memory Access, data transfer control sections) 800 for controlling the transfer of data between the data storage memory 117 and the cache memory 130.

The local memories 111 store programs to be executed by the open processors 119A, and the like. These programs can be written, for example, from the management terminal 160, via the internal LAN 151.

By plugging the connector 116B connected to the data transfer device 114 into a connector in the storage control device 100, the open channel control section 110A is connected electrically to the internal connection section 150, the management terminal 160, and the like, in the storage control device 100.

The mainframe channel control section 110B is constituted in the form of a board, comprising a single unit having a circuit board 118. The mainframe channel control section 110B may comprise one or a plurality of circuit boards 118. On the circuit board 118, there are formed: open processors 119B, open host I/F control LSIs (input/output control sections) 115B, a data transfer device 114, a data storage memory 117, local memories 111, and connectors 116.

The open host I/F control LSIs 115B provides communications interface functions for performing communications with a mainframe information processing device 200, and they receive data input/output requests from the mainframe information processing device 200, and control the transmission and reception of data between the data storage memory 117 and the mainframe information processing device 200. In the case of the mainframe channel control section 110B, the storage position of the data stored in the data storage memory 117 is controlled by the mainframe host I/F control LSIs 115B. The connectors 116A which are connected to the mainframe host I/F control LSIs 115B constitute communications ports which are connected in a communicable fashion to the mainframe information processing device 200.

The mainframe processor 119B control the cache memory 130. In other words, the mainframe processors 119B control the storage position in the cache memory 130 of data transmitted to and received from the mainframe information processing device 200 by the mainframe host I/F control LSIs 115B.

The data storage memory 117 is a memory for storing data transmitted to and received from the mainframe information processing device 200, by the mainframe channel control section 110B. For example, if a mainframe host I/F control LSI 115B has received write data from the mainframe information processing device 200, then this write data is temporarily written to a storage position in the data storage memory 117 indicated by the mainframe host I/F control LSI 115B. This write data is then transferred to the cache memory 130 by means of the data transfer device 114.

In this case, the write data transmitted by the mainframe information processing device 200 is transmitted by being divided into prescribed data blocks, as described previously. When the write data transmitted by the mainframe information processing device 200 is transferred to the cache memory 130, better data transfer efficiency is obtained if these data blocks are bundled together for transfer, to a certain degree, since this makes it possible to reduce the number of data transfer operations required. The mainframe processor 119B decides how many data blocks should be bundled together for transfer, and indicates this decision to the data transfer device 114.

The data transfer device 114 controls the transfer of data between the data storage memory 117 and the cache memory 130, in accordance with instructions from the mainframe processor 119B. Further details are described hereinafter, but the data transfer device 114 has a memory controller 840 for reading and writing data, from and to the data storage memory 117, and one or a plurality of DMA (data transfer control sections) 800 for controlling the transfer of data between the data storage memory 117 and the cache memory 130.

The local memories 111 store programs to be executed by the mainframe processors 119B, and the like. These programs can be written, for example, from the management terminal 160, via the internal LAN 151.

By plugging the connector 116B connected to the data transfer device 114 into a connector in the storage control device 100, the mainframe channel control section 110B is connected electrically to the internal connection section 150, the management terminal 160, and the like, in the storage control device 100.

Disk Control Sections

Figure 6:
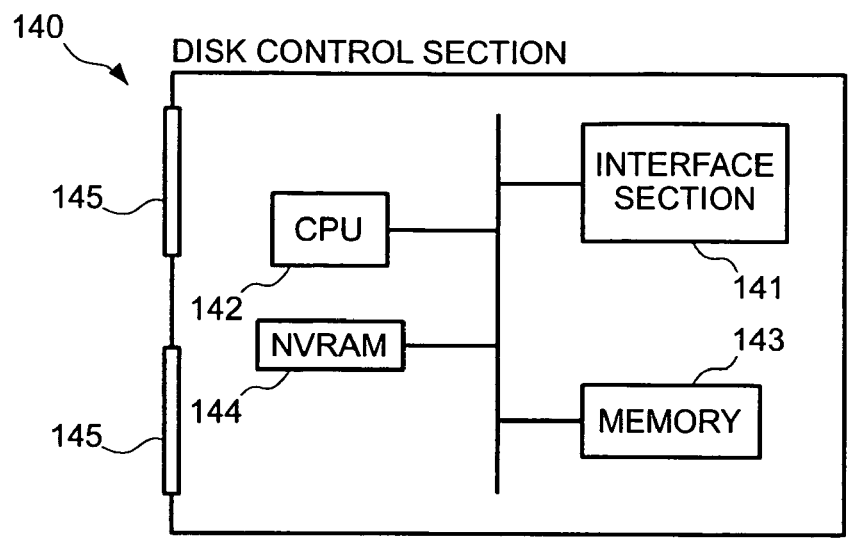
FIG. 6 is a block diagram showing a disk control section relating to the present embodiment.

Next, a diagram illustrating the composition of a disk storage section 140 is shown in FIG. 6.

The disk control section 140 comprises an interface section 141, a memory 143, a CPU 142, an NVRAM (nonvolatile random-access memory) 144, and connectors 145, these respective elements being formed into a single integrated unit.

The interface section 141 is provided with a communications interface for performing communications with a channel control section 110, and the like, via the internal connection section 150, and a communications interface for performing communications with the storage drive device 300.

The CPU 142 performs overall control of the disk control section 140, and also performs communications with the channel control sections 110, the storage drive device 300 and the management terminal 160. By executing various programs stored in the memory 143 and the NVRAM 144, by means of the CPU 142, the functions of the disk control section 140 relating to the embodiment are achieved.

The NVRAM 144 is a nonvolatile memory storing programs for controlling the CPU 142. The contents of the programs stored in the NVRAM 144 can be written, and overwritten, in accordance with instructions from the management terminal 160.

Furthermore, the disk control section 140 is provided with connectors 145. By plugging a connector 145 into a connector in the storage control device 100, the disk control section 140 is connected electrically to the internal connection section 150 in the storage control device 100, and to the storage drive device 300, management terminal 160, and the like.

Information Processing Devices

Figure 7:
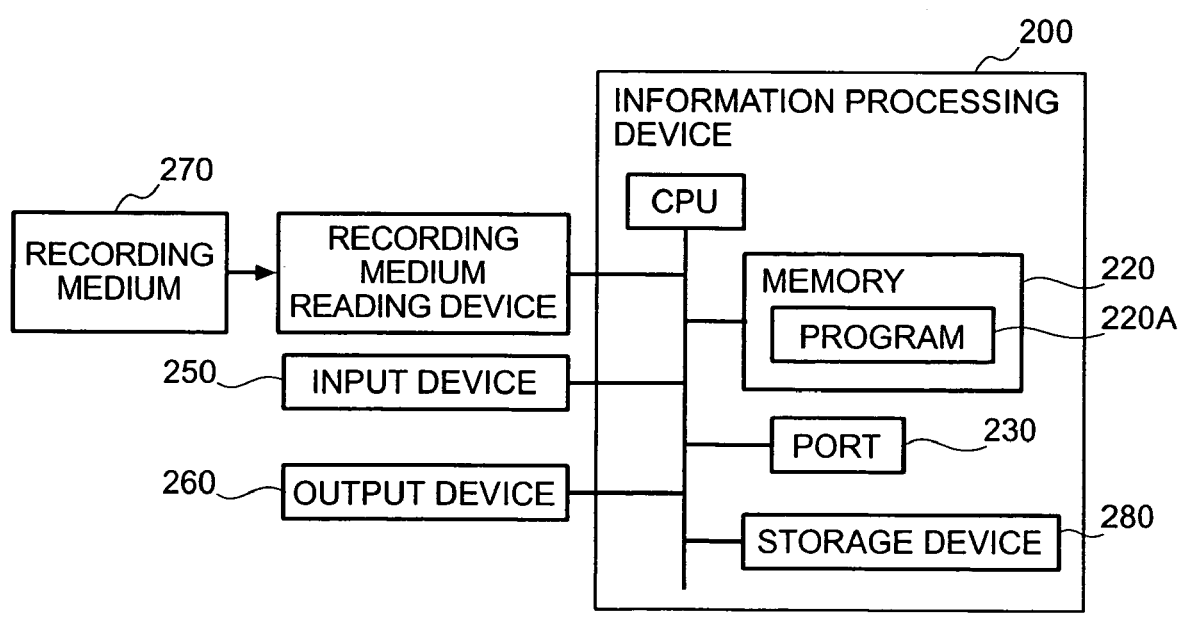
FIG. 7 is a block diagram showing an information processing device relating to the present embodiment.

Next, a block diagram of the composition of an information processing device 200 relating to the present is illustrated in FIG. 7. As described above, the information processing device 200 may be an open information processing device 200 or a mainframe information processing device 200, but since both have essentially the same composition, reference is made simply to "information processing device 200" if there is no need to distinguish between the two types of device.

The information processing device 200 comprises a CPU 210, a memory 220, a port 230, a recording medium reading device 240, an input device 250, an output device 260, and a storage device 280.

The CPU 210 performs overall control of the information processing device 200, and by executing a program 220A constituted by code for carrying out various operations stored in the memory 220, various functions relating to the present embodiment are achieved. For example, information processing services, such as automatic deposit and payment services for a bank, as described above, can be provided by means of the CPU 210 executing a program 220A. Furthermore, by means of the CPU 210 executing a program 220A, it is possible to display a web page supplied by a web server operating on the management terminal 160 described above, to change the composition of the physical disk drives 330, to set up the paths which are the communications routes between the information processing devices 200 and the channel control sections 110, and to set up the logical volumes 310, and the like.

The recording medium reading device 240 is a device for reading out programs, data, and the like, recorded on a recording medium 270. The programs and data read out in this fashion are stored in the memory 220 and the storage device 280. Consequently, for example, it is possible to read out a program 220A recorded on the recording medium 270, from the recording medium 270, by means of the recording medium reading device 240, and to store same in the memory 220 and storage device 280. A flexible disk, CD-ROM, semiconductor memory, or the like, may be used as the recording medium 270.

A mode may be adopted wherein the recording medium reading device 240 is built into the information processing device 200, or a mode may be adopted wherein it is fitted externally. The storage device 280 may be, for example, a hard disk device, a semiconductor storage device, or the like. Furthermore, the storage device 280 may be built into the information processing device 200, or it may be fitted externally. If fitted externally, the storage device 280 may be the storage device 280 of another information processing device 200 which is connected by means of a communications network. Furthermore, it may also be a storage system 600 connected via the SAN 500.

The input device 250 is a user interface which is used by an operator, or the like, operating the information processing device 200, in order to input data, or the like, to the information processing device 200. A keyboard, mouse, or the like, may be used as an input device 250. The output device 260 is a user interface for outputting information externally. A display, printer, or the like, may be used as an output device 260. The port 230 may be a device for performing communications with an open channel control section 110A, via the SAN 500. In this case, the port 230 may be constituted by means of a HBA (Host Bus Adapter), for example. Furthermore, the port 230 may be a device for performing communications with a mainframe channel control section 110B. Moreover, the port 230 may also be a device for performing communications with another information processing device 200 or management terminal 160, by means of a communications network, such as a LAN, or the like. In this case, for example, it is possible for a program 220A to be received from the other information processing device 200, via the port 230, and then stored in the memory 220 or storage device 280.

Data Transfer Device

Next, a data transfer device 114 relating to the present embodiment will be described with reference to FIG. 8.

Figure 8:
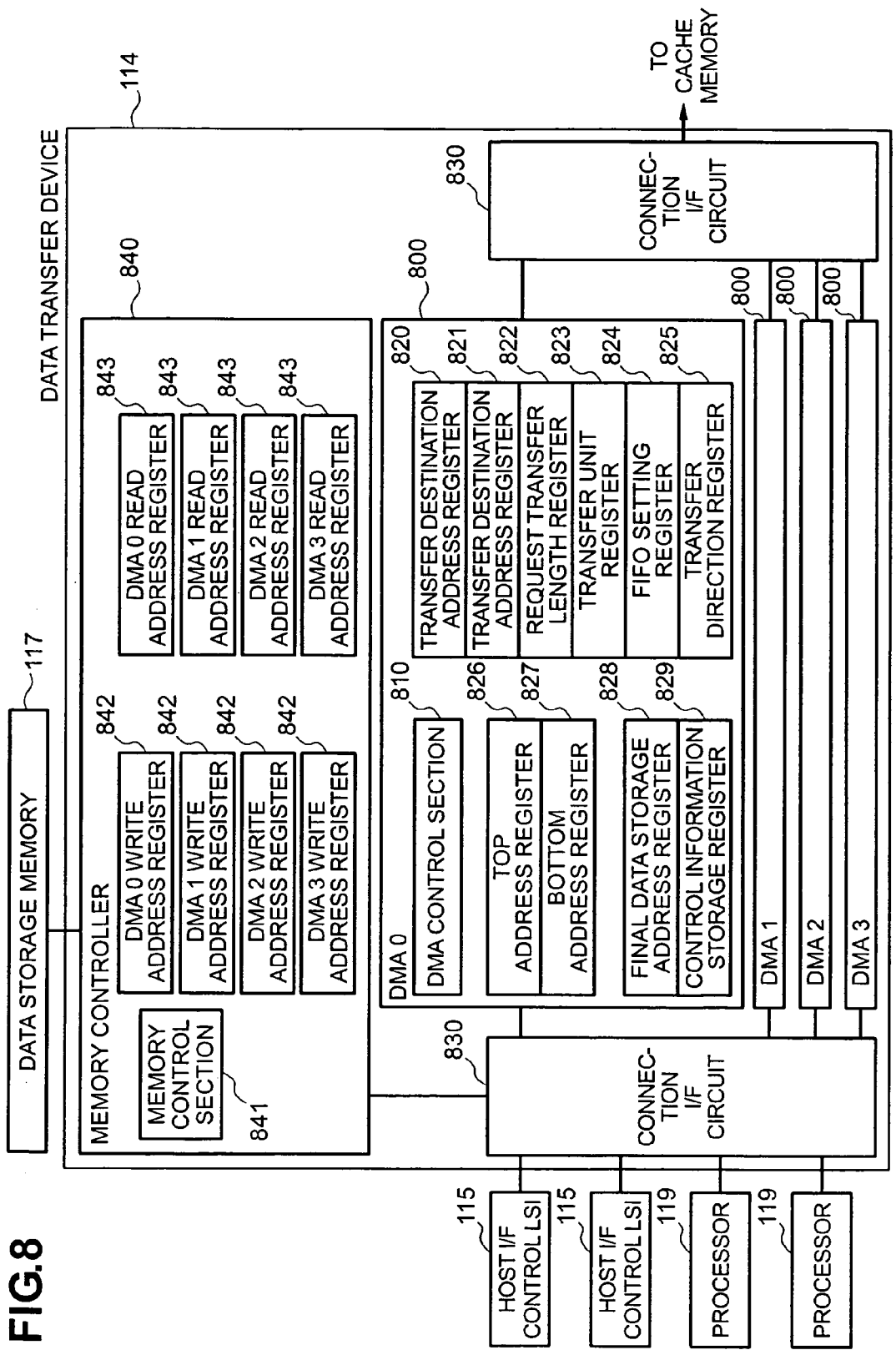
FIG. 8 is a diagram showing a data transfer device relating to the present embodiment.

As shown in FIG. 8, the data transfer device 114 relating to the present embodiment comprises a memory controller 840, DMAs 0–3 (800), and a connection I/F (Interface) circuit 830.

The memory controller 840 writes and reads data to and from the data storage memory 117. The memory controller 840 comprises a memory control section 841, write address registers 842, and read address registers 843. The write address registers 842 store write addresses for writing data to the data storage memory 117. The read address registers 843 store read addresses for reading data from the data storage memory 117. As shown in FIG. 8, the write address registers 842 and the read address registers 843 are provided respectively for each one of the DMAs 0–3 (800). Therefore, each one of the DMAs 0–3 (800) is able to instruct reading or writing of data, to or from the data storage memory 117, to the memory controller 840, in a mutually independent fashion. The memory control section 841 reads and writes data, from and to the address in the data storage memory 117 stored by the write address register 842 or the read address register 843.

Addresses in the data storage memory 117 are written to the write address registers 842 and the read address registers 843 by the host I/F control LSIs 115 and the DMAs 0–3 (800).

The DMAs 800 control the transfer of data between the data storage memory 117 and the cache memory 130. Each DMA 800 comprises a DMA control section 810, a transfer source address register 820, a transfer destination address register 821, a request transfer length register 822, a transfer unit register 823, a FIFO (First In First Out) settings register 824, a transfer direction register 825, a TOP address register 826, a BOTTOM address register 827, a final data storage address register 828, and a control information storage register 829.

The DMA control section 810 performs overall control of the DMA 800. The DMA control section 810 may also be constituted by hardware only, or it may be constituted by a combination of hardware and software.

The transfer source address register 820 stores a storage address of the data storage memory 117 or a storage address of the cache memory 130. If data stored in the data storage memory 117 is to be transferred to the cache memory 130, then a storage address of the data storage memory 117 is stored in the transfer source address register 820. If data stored in the cache memory 130 is to be transferred to the data storage memory 117, then a storage address of the cache memory 130 is stored in the transfer source address register 820. The transfer source address is written to the transfer source address register 820 by the DMA control section 810, on the basis of data transfer information transmitted by the processor 119. The data transfer information is described hereinafter.

The transfer destination address register 821 stores a storage address of the data storage memory 117 or a storage address of the cache memory 130. If data stored in the data storage memory 117 is to be transferred to the cache memory 130, then a storage address of the cache memory 130 is stored in the transfer destination address register 821. If data stored in the cache memory 130 is to be transferred to the data storage memory 117, then a storage address of the cache memory 117 is stored in the transfer destination address register 821. The transfer destination address is written to the transfer destination address register 821 by the DMA control section 810, on the basis of data transfer information transmitted by the processor 119.

The request transfer length register 822 stores the data length indicated in the data input/output request received by the channel control section 110 from the information processing device 200. For example, if the channel control section 110 has received a data write request of 100 kB from the information processing device 200, then 100 kB will be stated in the request transfer length register 822. In this case, the write data is divided into a plurality of data blocks for transmission from the information processing device 200 to the channel control section 110, as described previously. The data length is written to the request transfer length register 822 by the DMA control section 810, on the basis of data transfer information transmitted by the processor 119.

The data length of the data to be transferred between the data storage memory 117 and the cache memory 130 is stored in the transfer unit register 823. For example, as described above, if the channel control section 110 receives a data write request of 100 kB from the information processing device 200, then if 10 kB is stored in the transfer unit register 823, the DMA 800 will start transfer of 10 kB of the write data transmitted by the information processing device 200, to the cache memory 130, each time that 10 kB of data has been stored in data storage memory 117. The transfer unit is written to the transfer unit register 823 by the DMA control section 810, on the basis of data transfer information transmitted by the processor 119.

The FIFO settings register 824 stores information indicating whether or not to perform data transfer between the information processing device 200 and the cache memory 130 by using the data storage memory 117 as a FIFO. For example, if information indicating that the data storage memory 117 is to be used as a FIFO memory has been written to the FIFO settings register 824, then if the channel control section 110 has received a data write request of 100 kB from the information processing device 200, as described above, for example, and if 10 kB is stored in the transfer unit register 823, then the DMA 800 will start transfer of 10 kB of write data from the information processing device 200, into the cache memory 130, each time 10 kB of data has been stored in the data storage memory 117, without waiting for all of the 100 kB of data to be written to the data storage memory 117 from the information processing device 200. In other words, so-called "wormhole" transfer is carried out. On the other hand, if information indicating that the data storage memory 117 is not to be used as a FIFO memory is written to the FIFO settings register 824, then in the case of the example described above, if the channel control section 110 has received a data write request of 100 kB from the information processing device 200, then the DMA 800 will wait for all of the 100 kB of data to be written from the information processing device 200 to the data storage memory 117, before starting to transfer the 100 kB of write data to the cache memory 130. In other words, so-called "store and forward" transfer is carried out. Settings are written to the FIFO settings register 824 by the DMA control section 810, on the basis of data transfer information transmitted by the processor 119.

The transfer direction register 825 stores information indicating whether the data transfer carried out between the data storage memory 117 and the cache memory 130 is performed in the direction for transferring data stored in the data storage memory 117 to the cache memory 130, or in the direction for transferring data stored in the cache memory 130 to the data storage memory 117. The transfer direction is written to the transfer direction register 825 by the DMA control section 810, on the basis of data transfer information transmitted by the processor 119.

The TOP address register 826 stores the storage address of the data storage memory 117 for the head data item of each transfer unit, which is written to the data storage memory 117 by the host I/F control LSI 115 or DMA 800, when data transfer is carried out between the data storage memory 117 and the cache memory 130 in the aforementioned transfer units. The value in this register is updated, each time data corresponding to one transfer unit is transferred. The value in the TOP address register 826 is updated by the DMA control section 810, each time transfer of data corresponding to one transfer unit is carried out.

The BOTTOM address register 827 stores the storage address of the data storage memory 117 for the data written to the data storage memory 117 by the host I/F control LSI 115 or the DMA 800. The value of the BOTTOM address register 827 is updated by the DMA control section 810 in accordance with the value of the write address register 842 in the memory controller 840. In other words, the DMA control section 810 monitors the write address register 842 in the memory controller 840, and each time the value of the write address register 842 is updated, it writes the updated value of the write address register 842 to the BOTTOM address register 827. The DMA control section 810 is then able to identify the data length of the data stored in the data storage memory 117, on the basis of the difference between the address stored in the BOTTOM address register 827 and the address stored in the TOP address register 826. If this data length has reached the transfer unit, then the DMA control section 810 is able to start data transfer.

The final data storage address register 828 is written with information indicating the final write address of the write data, when all of the write data transmitted by the information processing device 200 has been written to the data storage memory 117 by the host I/F control LSI 115. For example, if the channel control section 110 has received a data write request of 100 kB from the information processing device 200, then the storage address in the data storage memory 117 of the 100$^{th}$ kB of data written to the data storage memory 117 by the host I/F control LSI 115, is written to the final data storage address register 828. The information indicating the final write address is written to the final data storage address register 828 by the DMA control section 810, on the basis of the data transfer information transmitted by the processor 119.

If the host I/F control LSI 115 receives from the information processing device 200 information indicating that only write data that is shorter than the write data length indicated in the data write request transmitted by the information processing device 200 is to be transmitted, then control information indicating this fact is written to the control information storage register 829. This control information is written to the control information storage register 829 by the DMA control section 810, on the basis of data transfer information transmitted by the processor 119.

The connection I/F circuit 830 is a communications interface circuit for performing communications between the memory controller 840, the DMAs 800, the host I/F control LSIs 115, the processors 119, and the like, by means of a PCI (Peripheral Component Interconnect) bus. However, it is also possible to adopt a composition that complies with standards other than PCI. In this case, the connection I/F circuit 830 may be a communications interface circuit that complies with the respective specifications.

Data Transfer

Next, an overview of data transfer in a channel control section 110 provided in the storage control device 100 relating to the present embodiment is described with reference to FIG. 9.

Figure 9:
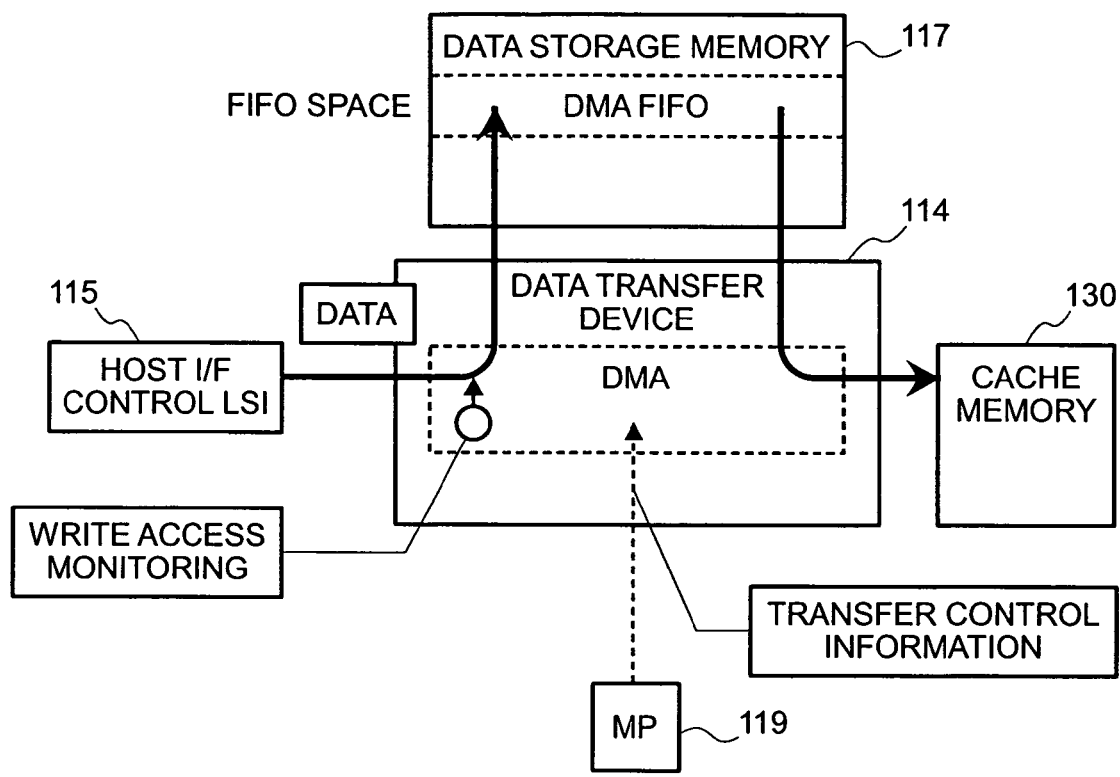
FIG. 9 is a diagram for explaining data transfer relating to the present embodiment.

In a channel control section 110 relating to the present embodiment, as shown in FIG. 9, if the host I/F control LSI 115 has received a data write request from the information processing device 200, then the write data is stored temporarily in the data storage memory 117, and is then read out from the data storage memory 117 and transferred to the cache memory 130. In this case, as described previously, depending on the settings in the FIFO settings register 824, the transfer of data from the data storage memory 117 to the cache memory 130 may be started before all of the write data has been written to the data storage memory 117. In other words, the channel control section 110 provided in the storage control device 100 relating to the present embodiment is able to use the data storage memory 117 as a FIFO memory.

Here, in the present embodiment, the data storage memory 117 is constituted as a separate circuit to the data transfer device 114, and consequently, it is possible to use a data storage memory 117 having a storage capacity suited to the requirements. In this way, it is possible to compose a FIFO memory having a storage capacity that suits requirements. In other words, if the data storage memory 117 was constituted in an integrated fashion with the data transfer device 114, or if the data storage memory 117 was incorporated inside the data transfer device 114, then the storage capacity of the data storage memory 117 would be restricted by the limit of the number of transistors that can be integrated onto a single LSI, but in the present embodiment, it is possible to avoid restrictions of this kind. Accordingly, it is possible to use the data storage memory 117 as a plurality of large-capacity FIFO memories. FIG. 9 shows the data transfer device 114 as only having one DMA 800, but as illustrated in FIG. 8, it is possible to provide a plurality of DMAs 800 in the data transfer device 114. Each of the DMAs 800 may use the data storage memory 117 as a large-capacity FIFO memory. Moreover, by providing a plurality of write address registers 842 and read address registers 843, for each DMA 800, in the memory controller 840, it is also possible to constitute a plurality of FIFO memories in the data storage memory 117, for each DMA 800. FIG. 8 shows the data transfer device 114 as having four DMAs 800, but it is of course also possible to provide a greater number of DMAs 800 than this.

By this means, in the present embodiment, the storage control device 100 is able to process data input and output requests transmitted by the information processing device 200, at higher speed. In other words, it is possible to increase the speed of data reading and writing operations. Furthermore, it is also possible to receive data input/output requests of large volume from a plurality of information processing devices 200, and to read or write data accordingly.

Figure 10:
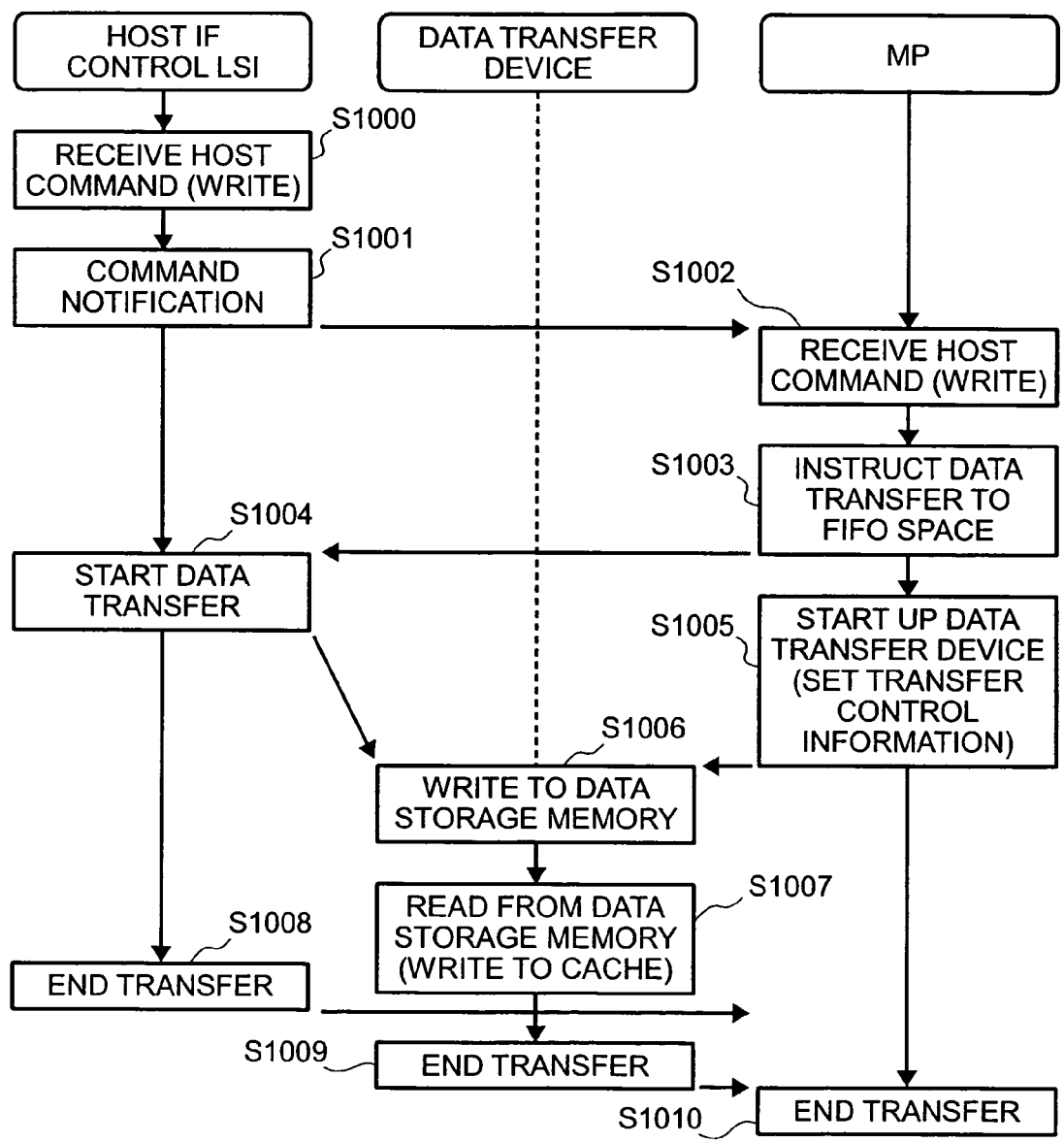
FIG. 10 is a flowchart showing the sequence of data write processing relating to the present embodiment.
Figure 11:
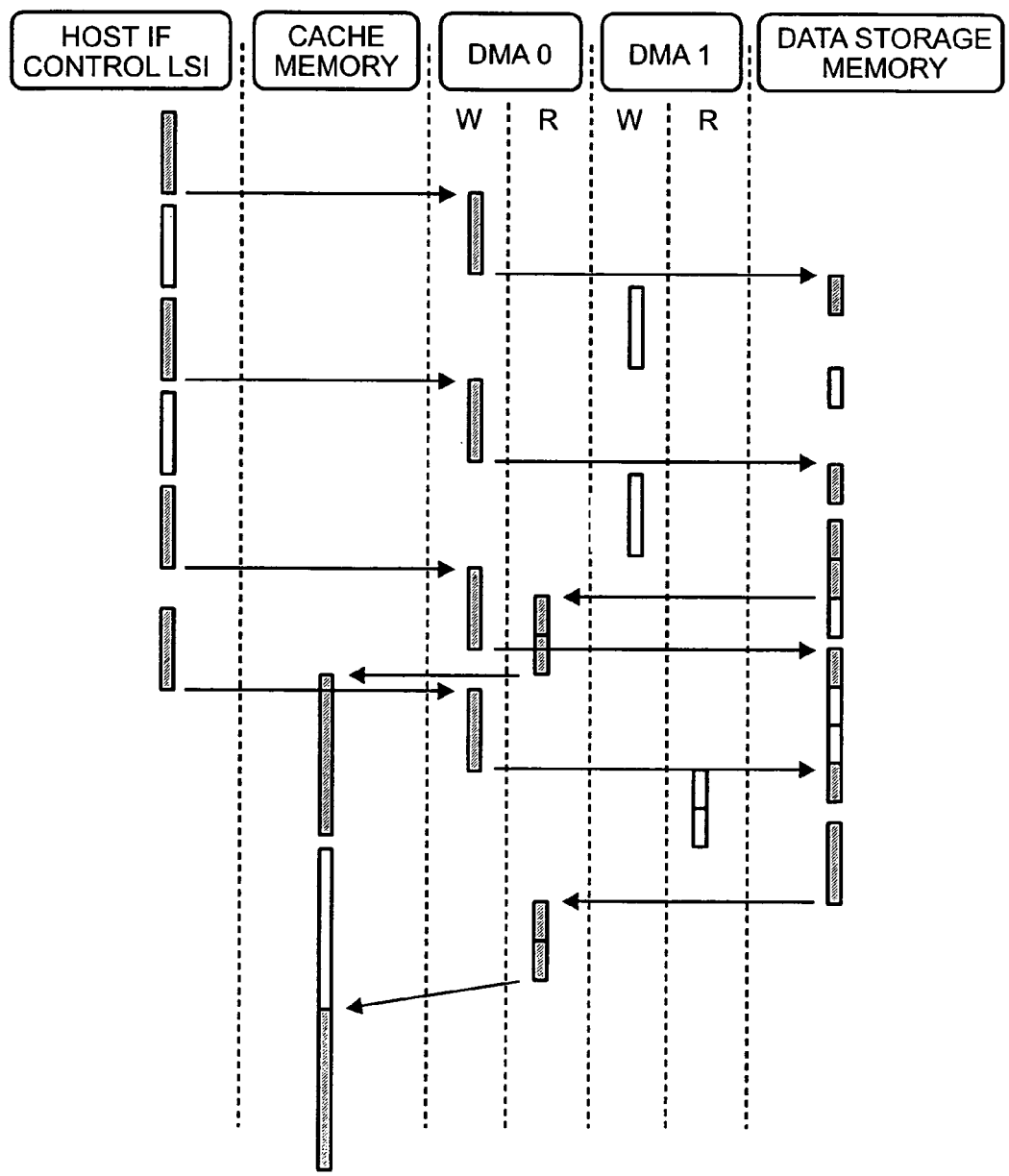
FIG. 11 is a data flow showing the flow of write data relating to the present embodiment.
Figure 12:
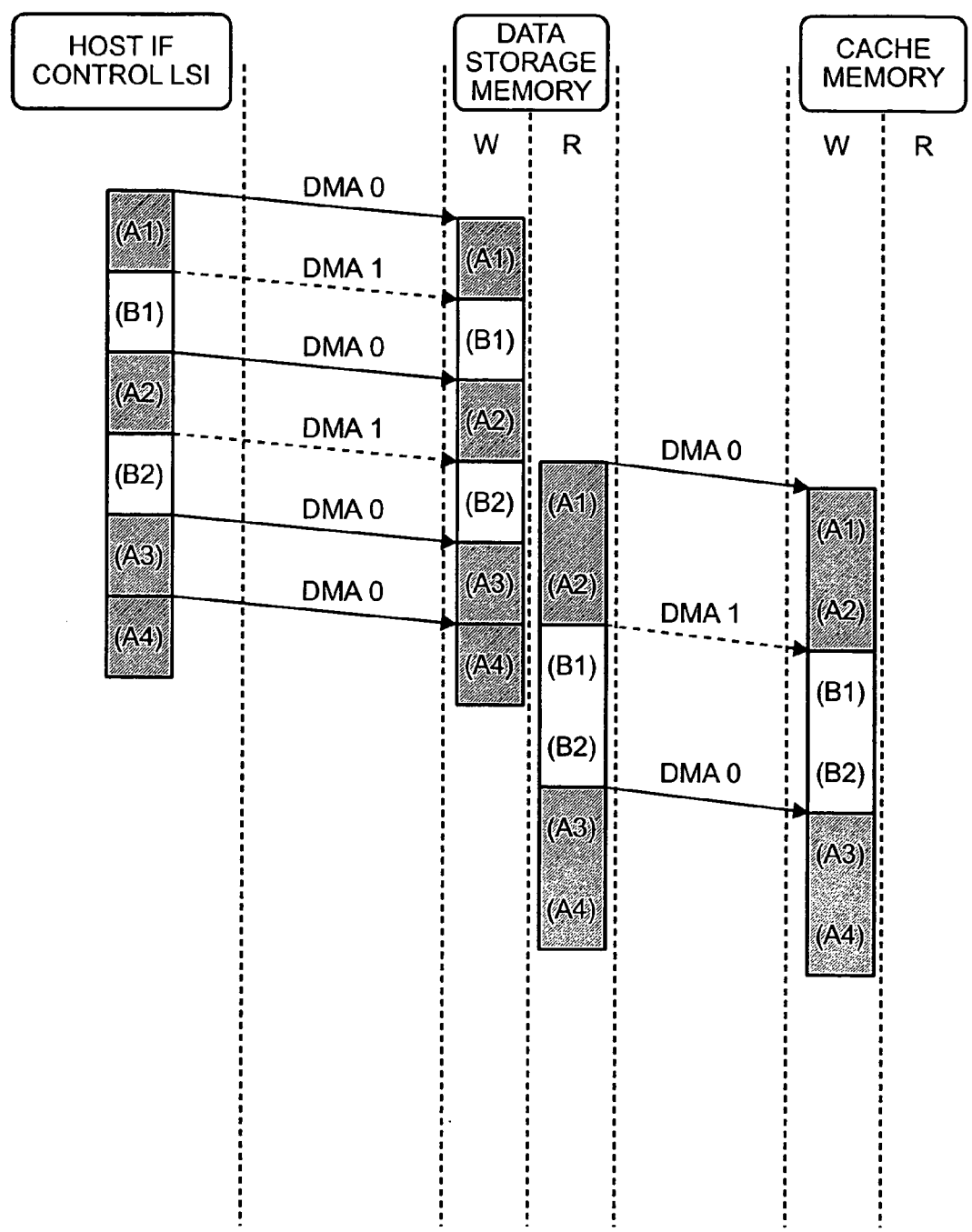
FIG. 12 is a data flow showing the flow of write data relating to the present embodiment.

FIG. 10 is a flowchart showing the sequence of processing carried out in a case where the host I/F control LSI 115 has received a data write request from an information processing device 200. Furthermore, FIG. 11 and FIG. 12 show data flows illustrating the flow of the write data. Moreover, the flowchart in FIG. 10 shows the sequence of processing in an open channel control section 110. The sequence of processing in a mainframe channel control section 110 is described hereinafter. Furthermore, FIG. 11 and FIG. 12 together illustrate a sequence in which the host I/F control LSI 115 receives two types of data write request, and these respective write data are transferred via the data storage memory 117, to the cache memory 130, by the DMA0 (800) and the DMA1 (800). In FIG. 11 and FIG. 12, the first write data is illustrated by the shaded pattern in each data block, and the second write data is illustrated by the white pattern in each data block. In FIG. 12, the first write data is indicated by (A1), (A2), (A3) and (A4) for each data block, and the second write data is indicated by (B1), (B2) for each data block. Furthermore, in FIG. 11 and FIG. 12, "W" indicates "Write" and "R" indicates "Read". The write data transmitted by the information processing device 200 is transmitted by being divided up into prescribed data blocks, as described above, but FIG. 11 and FIG. 12 show a situation where respective data blocks are bundled together into prescribed transfer units in the data storage memory 117, before transfer to the cache memory 130.

In FIG. 10, firstly, when the host I/F control LSI 115 receives a data write request from an information processing device 200 (S1000), the host I/F control LSI 115 transmits the data write request to the processor (MP) 119 (S1001). When the processor 119 receives the data write request (S1002), it transmits storage position information containing information indicating the storage position in the data storage memory 117 to be used for the write data, to the host I/F control LSI 115 (S1003). Consequently, the host I/F control LSI 115 starts to transfer data to the data storage memory 117 (S1004). More specifically, the host I/F control LSI 115 starts to transmit information indicating a storage position in the data storage memory 117 for the write data, and the write data itself, to the memory controller 840, and the memory controller 840 starts to write the write data to the data storage memory 117, in accordance with the information indicating the storage position for the write data in the data storage memory 117 written in the write address register 842 (S1006).

It is also possible to include information specifying a DMA 800 in the storage position information, in such a manner that the host I/F control LSI 115 starts to transmit information indicating the storage position for the write data in the data storage memory 117, and the write data itself, to the specified DMA 800, and the DMA 800 starts to transmit the information indicating the storage position for the write data in the data storage memory 117, and the write data itself, to the memory controller 840.

The processor 119, on the other hand, transmits data transfer information to the DMA 800 (S1005). The data transfer information thus transmitted contains information indicating the storage position for the write data in the data storage memory 117, and information indicating the storage position for the write data in the cache memory 130. Moreover, it may also contain information indicating the final write address of the write data in the data storage memory 117.

More specifically, for example, as described above, it may contain information to be written to the transfer source address register 820, information to be written to the transfer destination address register 821, information to be written to the request transfer length register 822, information to be written to the transfer unit register 823, information to be written to the FIFO settings register 824, information to be written to the transfer direction register 825, information to be written to the final data storage address register 828, and information to be written to the control information storage register 829.

The DMA 800 then transmits a read request for the write data written in the data storage memory 117, to the memory controller 840, on the basis of data transfer information. More specifically, the DMA 800 writes the storage address of the write data to the read address register 843 of the memory controller 840, and instructs read-out of the write data.

The memory controller 840 starts to read out the write data from the data storage memory 117 (S1007), and the DMA 800 starts to transfer the write data that is to be read out, from the data storage memory 117, to the cache memory 130.

When the host I/F control LSI 115 and the DMA 800 have respectively completed data transfer, they transmit a transfer end report to the processor 119 (S1008, S1009). Thereby, the data transfer to the cache memory 130 is completed (S1010).

Figure 13:
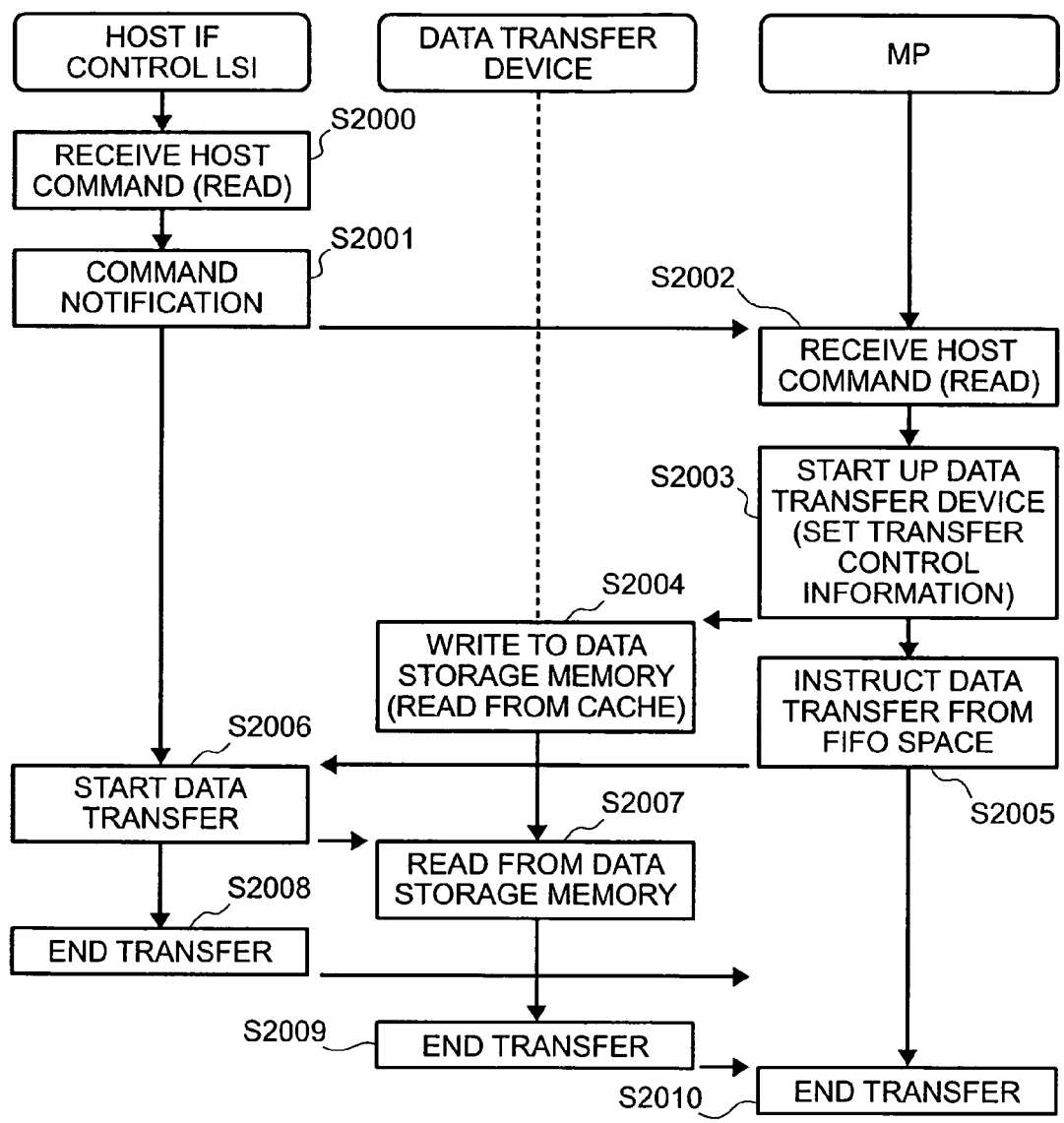
FIG. 13 is a flowchart showing the sequence of data read processing relating to the present embodiment.
Figure 14:
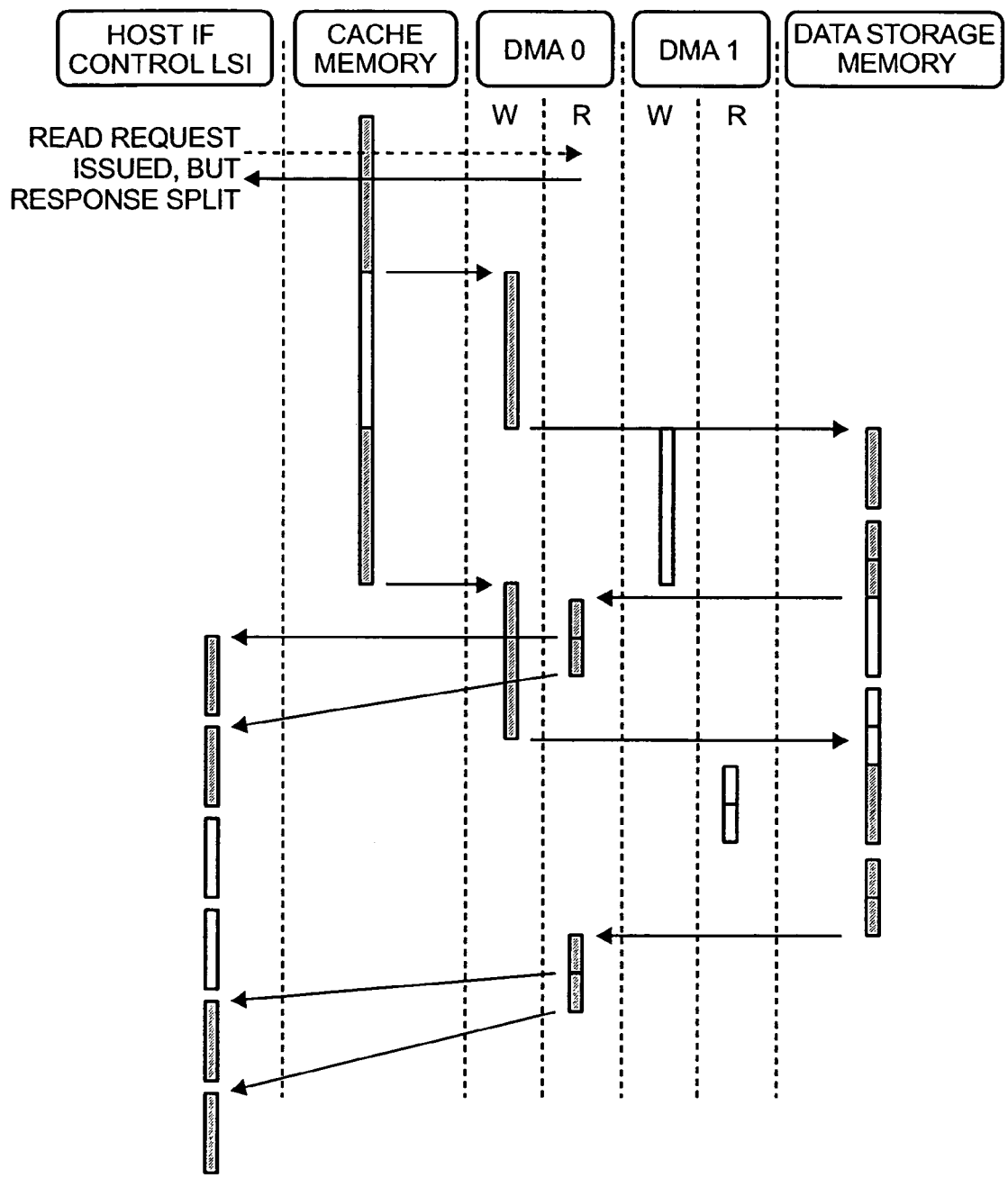
FIG. 14 is a data flow showing the flow of read data relating to the present embodiment.
Figure 15:
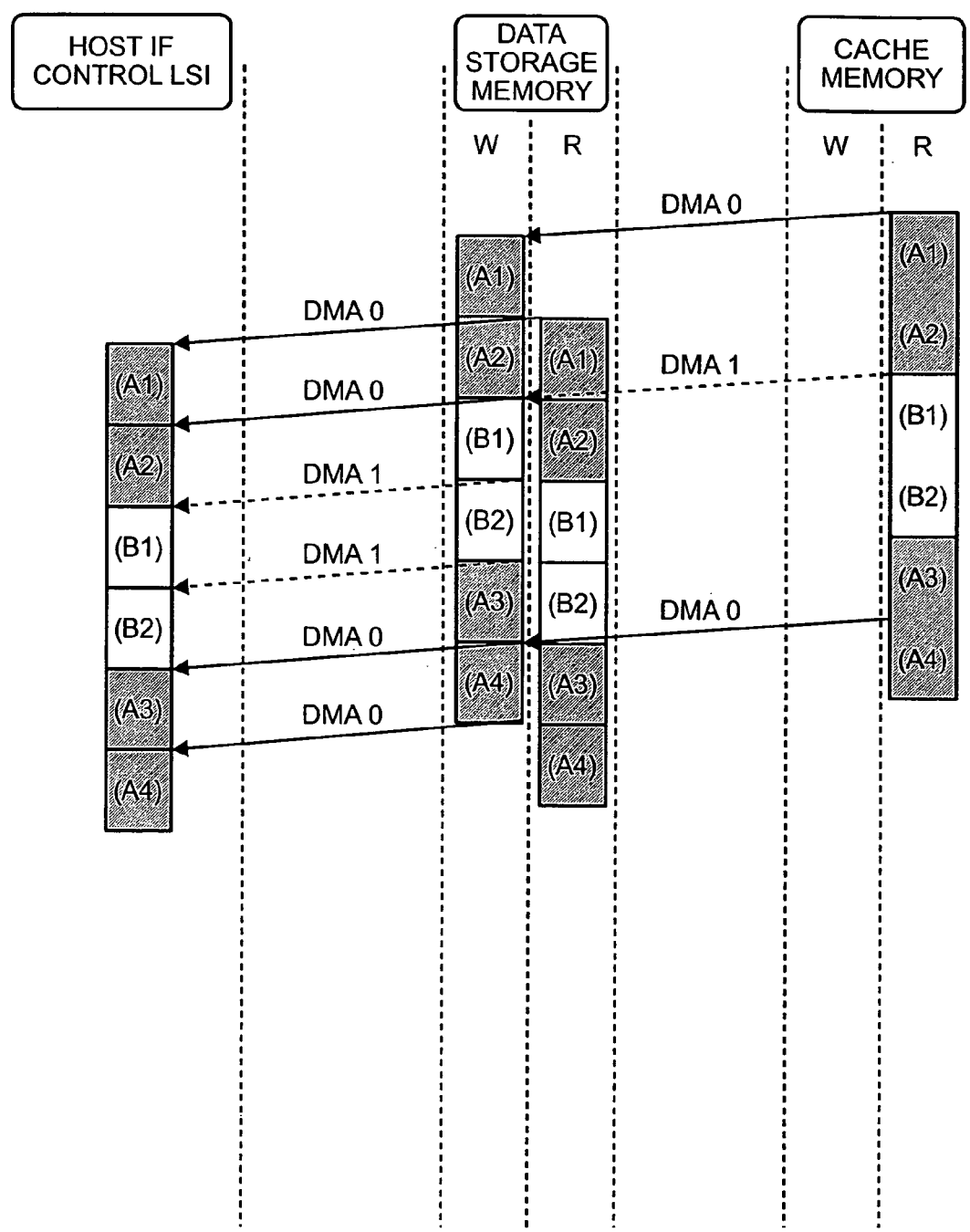
FIG. 15 is a data flow showing the flow of read data relating to the present embodiment.

Next, FIG. 13 is a flowchart showing the sequence of processing carried out in a case where the host I/F control LSI 115 has received a data read request from an information processing device 200. Furthermore, FIG. 14 and FIG. 15 show data flows illustrating the flow of the read data. Moreover, the flowchart in FIG. 13 shows the sequence of processing in an open channel control section 110. The sequence of processing in a mainframe channel control section 110 is described hereinafter.

Furthermore, FIG. 14 and FIG. 15 together illustrate a sequence in which the host I/F control LSI 115 receives two types of data read request, and these respective read data are read out to the cache memory 130, by the DMA0 (800) and the DMA1 (800), and transferred via the data storage memory 117 to the host I/F control LSI 115. In FIG. 14 and FIG. 15, the first read data is illustrated by the shaded pattern in each data block, and the second read data is illustrated by the white pattern in each data block.

In FIG. 15, the first read data is indicated by (A1), (A2), (A3) and (A4) for each data block, and the second read data is indicated by (B1), (B2) for each data block. Furthermore, in FIG. 14 and FIG. 15, "W" indicates "Write" and "R" indicates "Read". The read data transmitted by the information processing device 200 is transmitted by being divided up into prescribed data blocks, as described above, and FIG. 14 and FIG. 15 show a situation where the respective read data are divided into prescribed data blocks in the data storage memory 117, and then transferred to the host I/F control LSI 115.

In FIG. 13, firstly, when the host I/F control LSI 115 receives a data read request from an information processing device 200 (S2000), the host I/F control LSI 115 transmits the data read request to the processor (MP) 119 (S2001). When the processor 119 receives the data read request (S2002), it transmits data transfer information to the DMA 800 (S2003). Consequently, the DMA 800 starts to read out the read data from the cache memory 130, on the basis of the data transfer information, and the DMA 800 starts to transmit the information indicating the storage position of the read data in the data storage memory 117, and the read data itself, to the memory controller 840, and the memory controller 840 starts to transmit the read data to the data storage memory 117 (S2004).

On the other hand, the processor 119 transmits storage position information containing information indicating the storage position of the read data in the data storage memory 117, to the host I/F control LSI 115 (S2005). Accordingly, the host I/F control LSI 115 transmits a read request for the read data written in the data storage memory 117, to the memory controller 840, on the basis of the storage position information, and the memory controller 840 starts to read out the read data from the data storage memory 117 (S2007). The host I/F control LSI 115 then transmits the read data that is read out from the data storage memory 117, to the information processing device 200.

When the host I/F control LSI 115 and the DMA 800 have respectively completed data transfer, they transmit a transfer end report to the processor 119 (S2008, S2009). Thereby, the data transfer to the information processing device 200 is completed (S2010).

Figure 16:
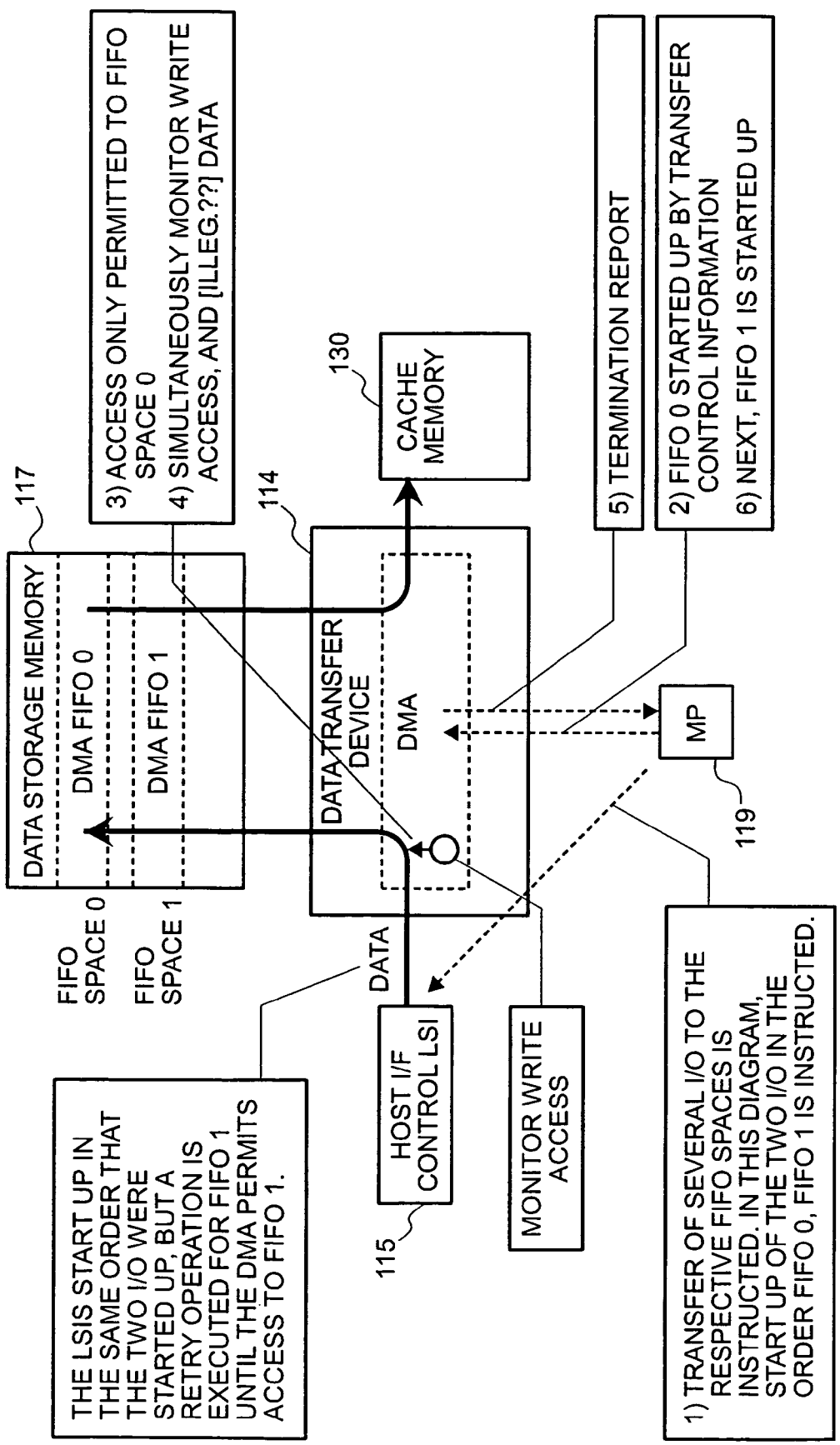
FIG. 16 is a diagram for explaining FIFO memories relating to a further embodiment.
Figure 18:
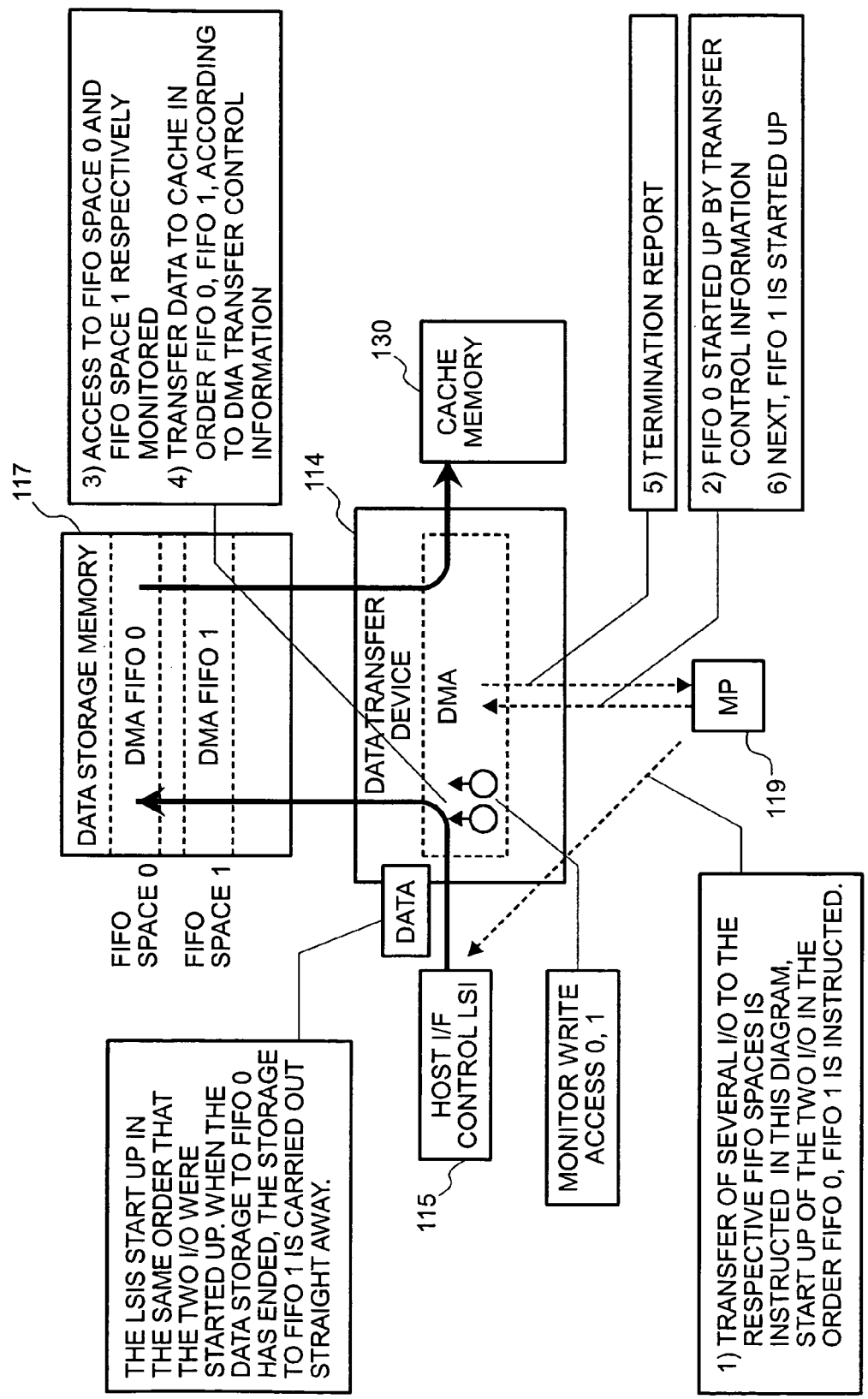
FIG. 18 is a diagram for explaining FIFO memories relating to the present embodiment.

Here, as described above, in the storage control device 100 relating to the present embodiment it is possible to compose a plurality of FIFO on the data storage memory 117, for each DMA 800. FIG. 16 and FIG. 18 illustrate a situation of this kind. FIG. 16 shows a case where one write address register 842 and one read address register 843 are provided in the memory controller 840 for each DMA 800, and where a plurality of FIFO memories are constituted in the data storage memory 117, for each DMA 800. FIG. 18 shows a case where a plurality of write address registers 842 and a plurality of read address registers 843 are provided in the memory controller 840 for each DMA 800, and where a plurality of FIFO memories are constituted in the data storage memory 117, for each DMA 800.

In the case of the composition shown in FIG. 16, since only one write address register 842 and one read address register 843 are provided for each of the DMAs 800, if the host I/F control LSI 115 has received a plurality of data input/output requests from the information processing devices 200, then it is not able to process reading or writing of the data corresponding to a second data input/output request, from or to the data storage memory 117, whilst it is reading or writing the data corresponding to a first data input/output request, from or to the data storage memory 117. In other words, the data corresponding to the second data input/output request cannot be read from or written to the data storage memory 117, until the reading or writing of data corresponding to the first data input/output request, from or to the data storage memory 117, has been completed. However, by adopting a composition in which a plurality of FIFO are provided in the data storage memory 117 for each of the DMAs 800, the processor 119 controlling the data storage memory 117 is able to establish FIFO memories in the data storage memory 117 for each of the respective data input/output requests, and therefore data writing to the data storage memory 117, or data reading from the data storage memory 117, can be instructed in advance to the host I/F control LSI 115. By this means, even if a further data input/output request is transmitted by an information processing device 200 before the read or write processing for data corresponding to a data input/output request transmitted previously by the information processing device 200 has been completed, the processor 119 is still able to carry out processing for each of the respective data input/output requests. Consequently, it is possible to improve data input and output performance.

Figure 17:
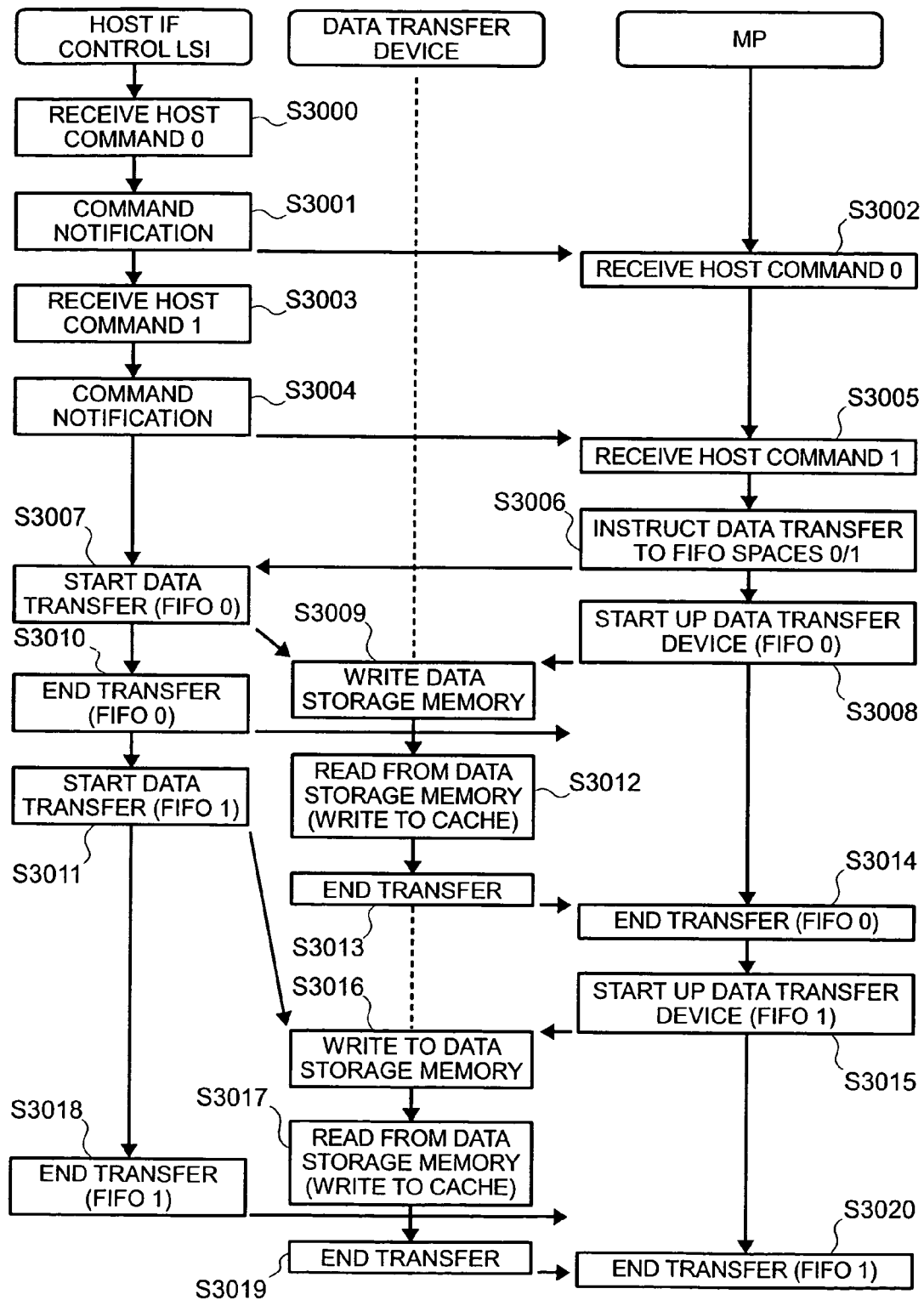
FIG. 17 is a flowchart showing the sequence of a plurality of data write processes relating to the present embodiment.

FIG. 17 is a flowchart showing the sequence of processing carried out in a case where the host I/F control LSI 115 has received two data write requests from an information processing device 200.

Firstly, when the host I/F control LSI 115 receives a first data write request from an information processing device 200 (S3000), the host I/F control LSI 115 transmits this first data write request to the processor (MP) 119 (S3001). The processor 119 receives this first data write request (S3002). Thereupon, when the host I/F control LSI 115 receives a second data write request from an information processing device 200 (S3003), the host I/F control LSI 115 transmits this second data write request to the processor (MP) 119 (S3004). The processor 119 receives this second data write request (S3005). Thereupon, the processor 119 transmits storage position information containing information indicating a storage position for the first write data in the data storage memory 117, and storage position information containing information indicating a storage position for the second write data in the data storage memory 117, to the host I/F control LSI 115 (S3006). Thereupon, firstly, the host I/F control LSI 115 starts to transfer the first write data to the data storage memory 117 (S3007). More specifically, the host I/F control LSI 115 starts to transmit information indicating a storage position in the data storage memory 117 for the first write data, and the write data itself, to the memory controller 840, and the memory controller 840 starts to write the first write data to the data storage memory 117, in accordance with the information indicating the storage position for the first write data in the data storage memory 117 written in the write address register 842 (S3009).

On the other hand, the processor 119 transmits data transfer information corresponding to the first data write request, to the DMA 800 (S3008).

The DMA 800 then transmits a read request for the first write data written in the data storage memory 117, to the memory controller 840, on the basis of the first data transfer information. More specifically, the DMA 800 writes the storage address of the first write data to the read address register 843 of the memory controller 840, and instructs read-out of the first write data.

The memory controller 840 starts to read out the first write data from the data storage memory 117 (S3102), and the DMA 800 starts to transfer the first write data that is to be read out, from the data storage memory 117, to the cache memory 130. When the host I/F control LSI 115 and the DMA 800 have respectively completed data transfer, they transmit a transfer end report to the processor 119 (S3010, S3013). By this means, data transfer of the first write data to the cache memory 130 is completed (S3014).

On the other hand, when the host I/F control LSI 115 has completed data transfer of the first write data to the data storage memory 117 (S3010), it starts data transfer of the second write data to the data storage memory 117 (S3011). More specifically, the host I/F control LSI 115 starts to transmit information indicating a storage position in the data storage memory 117 for the second write data, and the write data itself, to the memory controller 840, and the memory controller 840 starts to write the second write data to the data storage memory 117, in accordance with the information indicating the storage position for the second write data in the data storage memory 117 written in the write address register 842 (S3016).

On the other hand, the processor 119 transmits data transfer information corresponding to the second data write request, to the DMA 800 (S3015).

The DMA 800 then transmits a read request for the second write data written in the data storage memory 117, to the memory controller 840, on the basis of the second data transfer information. More specifically, the DMA 800 writes the storage address of the second write data to the read address register 843 of the memory controller 840, and instructs read-out of the second write data.

The memory controller 840 starts to read out the second write data from the data storage memory 117 (S3107), and the DMA 800 starts to transfer the second write data that is to be read out, from the data storage memory 117, to the cache memory 130.

When the host I/F control LSI 115 and the DMA 800 have respectively completed data transfer, they transmit a transfer end report to the processor 119 (S3018, S3019). By this means, data transfer of the second write data to the cache memory 130 is completed (S3020).

On the other hand, in the case of the composition shown in FIG. 18, since a plurality of write address registers 842 and a plurality of read address registers 843 are provided for each of the DMAs 800, then even if the host I/F control LSI 115 has received a plurality of data input/output requests from the information processing devices 200, it will be able to process reading or writing of the data corresponding to a second data input/output request, from or to the data storage memory 117, whilst it is reading or writing the data corresponding to a first data input/output request, from or to the data storage memory 117. By this means, even if a further data input/output request is transmitted by an information processing device 200 before the read or write processing for data corresponding to a data input/output request transmitted previously by the information processing device 200 has been completed, since processing of the respective data input/output requests can be executed in parallel, the data input/output performance can be enhanced yet further.

When a composition wherein only one write address register 842 and one read address register 843 are provided for each DMA 800, whilst a plurality of DMAs 800 are provided, as in the data transfer device 114 relating to the present embodiment illustrated in FIG. 8, is compared with a composition wherein only one DMA 800 is provided, but a plurality of write address registers 842 and a plurality of read address registers 843 are provided, for example, then in both cases, even if the host I/F control LSI 115 has received a plurality of data input/output requests from the information processing device 200, it will be possible to carry out reading and writing of data corresponding to a second data input/output request, from or to the data storage memory 117, whilst reading or writing data corresponding to a first data input/output request, from or to the data storage memory 117, thereby enabling the data input/output request performance to be further improved, and in view of this point, both compositions are equivalent.

In other words, firstly, in a composition in which a plurality of write address registers 842 and read address registers 843 are provided for each DMA 800, if the host I/F control LSI 115 has received two data write requests from the information processing device 200, then it is possible for reading and writing to the data storage memory 117 to be carried out by means of the DMA 800 indicating a write address in the data storage memory 117 for the write data corresponding to the second data input/output request, to a second write address register 842, whilst data is being read from or written to the data storage memory 117 by means of the DMA 800 indicating a write address in the data storage memory 117 for the write data corresponding to the first data input/output request, to a first write address register 842.

On the other hand, in a composition in which one write address register 842 and one read address register 843 are provided for each DMA 800, but a plurality of DMAs 800 are provided, as in the data transfer device 114 relating to the present embodiment illustrated in FIG. 8, if the host I/F control LSI 115 has received two data write requests from the information processing device 200, then it is possible for a second DMA 800 to carry out reading and writing to the data storage memory 117, by indicating a write address in the data storage memory 117 for the write data corresponding to the second data input/output request, to the write address register 842, whilst a first DMA 800 is reading or writing data, to or from the data storage memory 117, by indicating a write address in the data storage memory 117 for the write data corresponding to the first data input/output request, to the write address register 842.

In the present embodiment, as described above, the data storage memory 117 is constituted as a separate circuit to the data transfer device 114. Therefore, the number of components constituting the circuit board 118 of the channel control section 110 is increased. In general, if the number of components increases, the occurrence of faults will also increase. However, since the storage control device 100 is a device which controls a storage drive device 300 provided with storage volumes 310 for storing data, very high levels of reliability are required in the storage control device 100. For this reason, in the storage control device 100 relating to the present embodiment, when data is transferred between the host I/F control LSI 115 and the cache memory 130, as illustrated in FIG. 19 to FIG. 21, it is sought to improve reliability by appending a check code (security code) to the transferred data.

Figure 19:
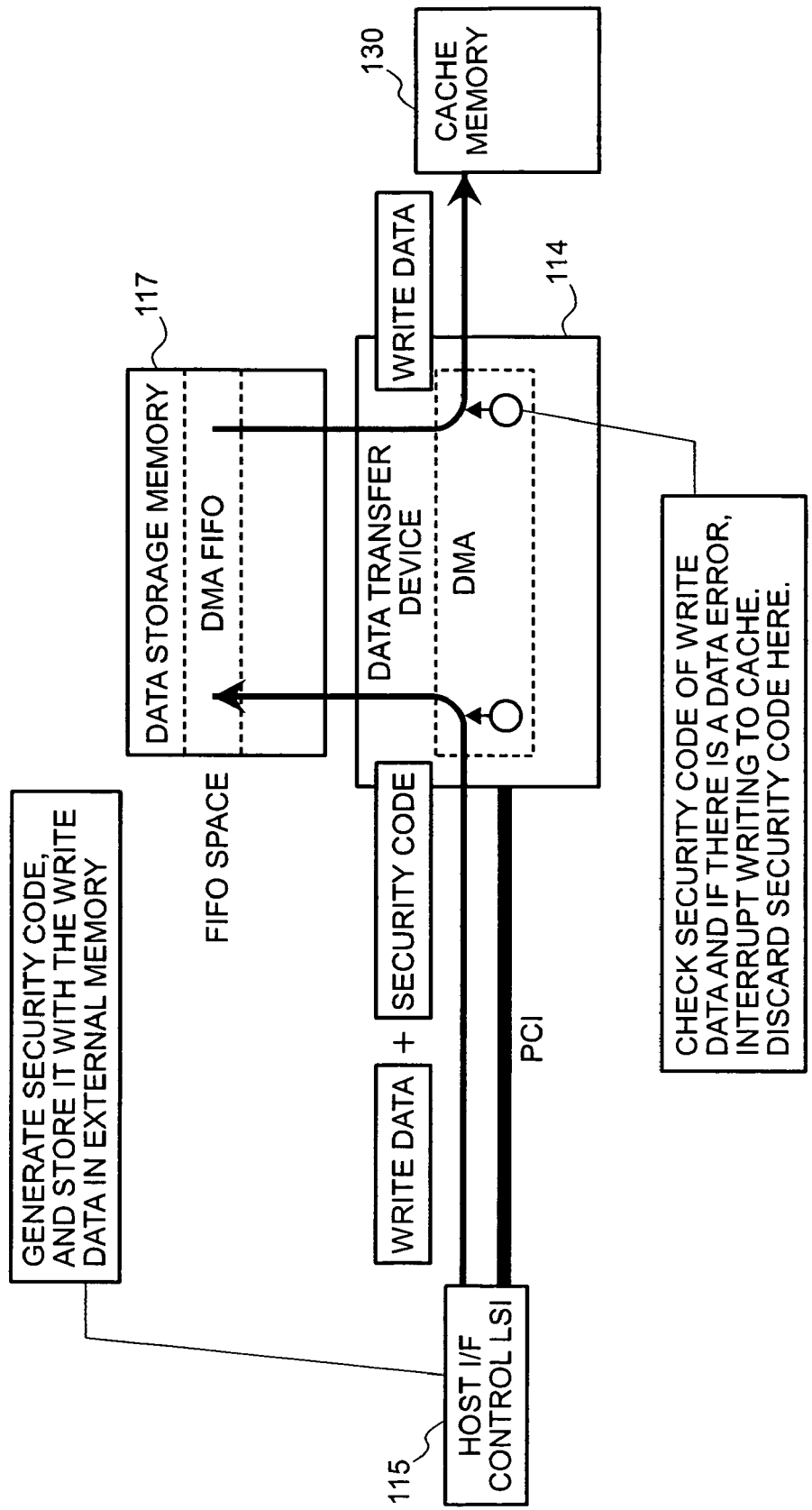
FIG. 19 is a diagram for explaining a check code relating to the present embodiment.

In other words, as shown in FIG. 19, if data is to be transferred from the host I/F control LSI 115 to the cache memory 130, when the host I/F control LSI 115 transmits write data, a check code, containing converted data calculated by converting a prescribed quantity of write data in accordance with a prescribed algorithm and error indicator data which indicates whether or not there is an error in the prescribed quantity of write data, is appended to each prescribed quantity of write data. Thereupon, when the DMA 800 transfers the write data from the data storage memory 117 to the cache memory 130, for each prescribed quantity of write data, the data calculated by converting the prescribed quantity of write data in accordance with the prescribed algorithm is compared with the converted data in the check code applied to the prescribed quantity of write data, and transfer of write data to the cache memory 130 is interrupted in accordance with the result of this comparison.

Here, the prescribed quantity of write data may be taken to be 512 B (bytes), for example. Of course, another data length can also be used. Furthermore, it is also possible to use CRC (Cyclic Redundancy Check), for example, as the prescribed algorithm. Other methods, such as parity checks, Hamming code checks, or the like, may also be used. Furthermore, the error indicator data is data which indicates whether or not there is an error in the prescribed quantity of write data, and for example, if there is an error, then it is set to "0", and if there is no error, then it is set to "1". Of course, another data may also be adopted. Furthermore, interruption of the transfer of the write data to the cache memory 130 in accordance with the comparison results means that it is possible to interrupt the transfer of write data to the cache memory 130 in cases where the data calculated by converting a prescribed quantity of write data in accordance with a prescribed algorithm, for example, does not match the converted data in the check code appended to the prescribed quantity of write data. Of course, depending on the algorithm, it is also possible for the transfer of write data to the cache memory 130 to be interrupted, if the data calculated by converting a prescribed quantity of write data in accordance with the prescribed algorithm, for example, matches the converted data in the check code appended to the prescribed quantity of write data.

Figure 20:
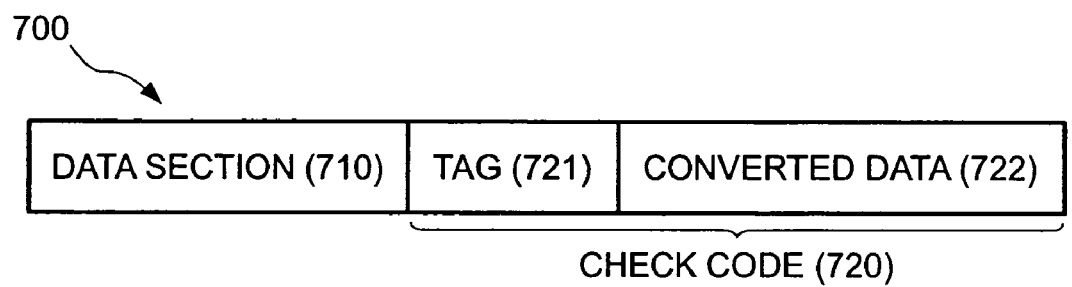
FIG. 20 is a diagram for explaining a check code relating to the present embodiment.
Figure 21:
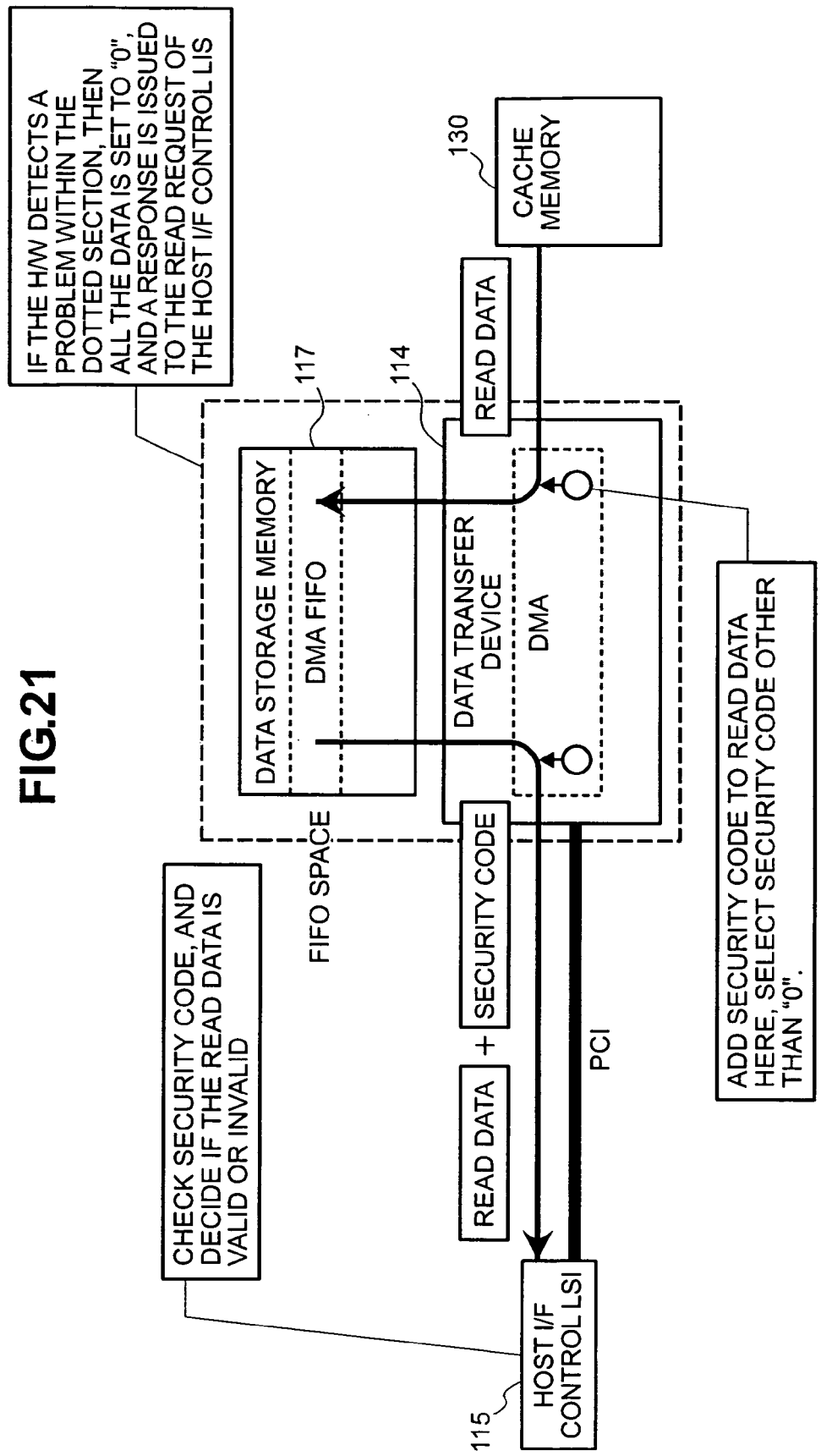
FIG. 21 is a diagram for explaining a check code relating to the present embodiment.
Figure 22:
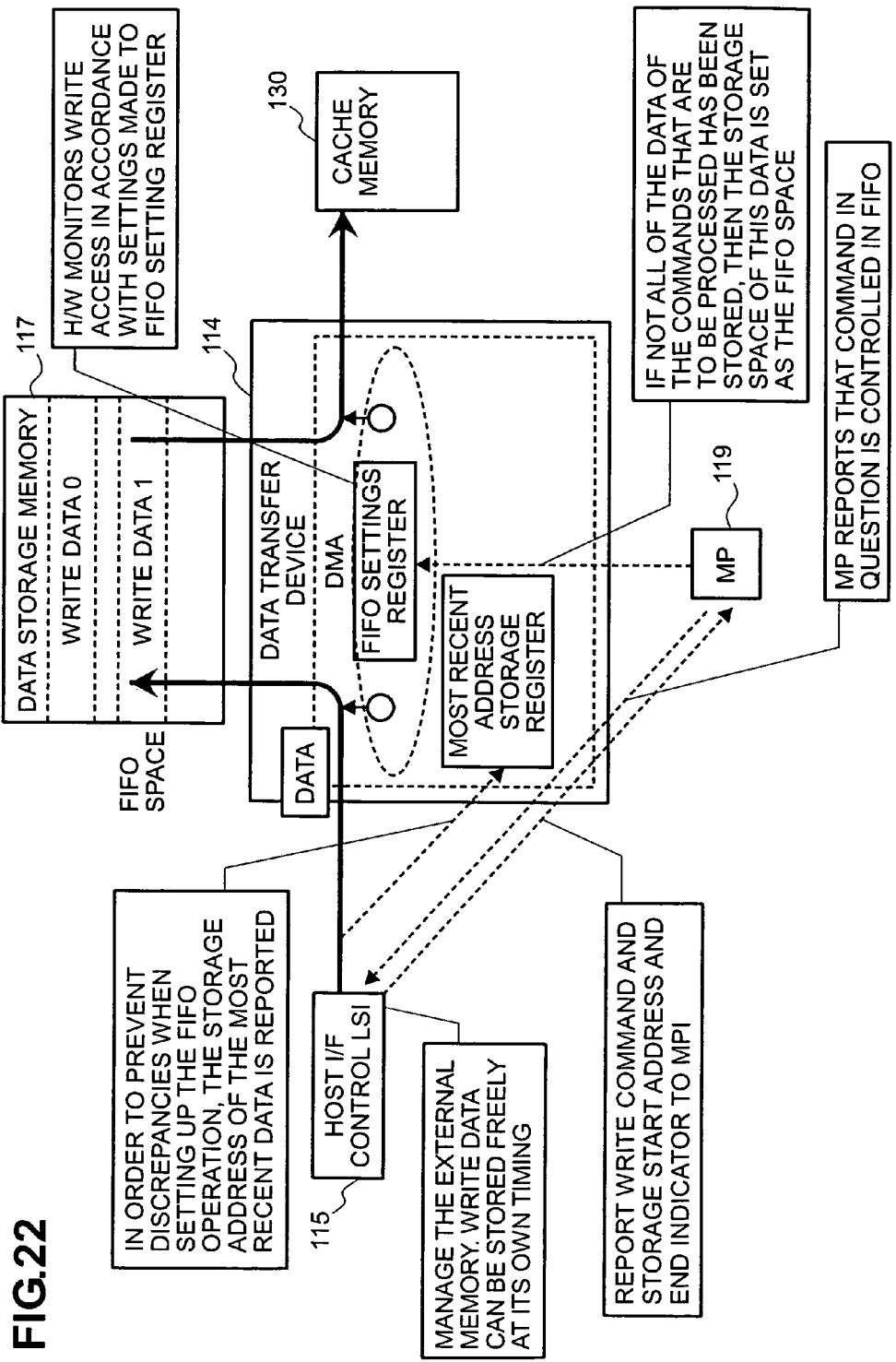
FIG. 22 is a diagram for explaining data transfer relating to the present embodiment.

FIG. 20 shows one example of data in a state where a check code has been appended to a prescribed quantity of data. The data part 710 is a prescribed quantity of write data or read data that is transmitted to or received from the information processing device 200. The check code 720 comprises a tag 721 and converted data 722. The converted data 722 is converted data calculated by converting a prescribed quantity of write data 710 in accordance with a prescribed algorithm. The tag 721 is error indicator data which indicates whether or not there is an error in the prescribed quantity of write data.

Furthermore, as shown in FIG. 21, if data is to be transferred from the cache memory 130 to the host I/F control LSI 115, when the DMA 800 transmits read data from the cache memory 130 to the data storage memory 117, a check code, containing converted data calculated by converting a prescribed quantity of read data in accordance with a prescribed algorithm and error indicator data which indicates whether or not there is an error in the prescribed quantity of read data, is appended to each prescribed quantity of read data. Each time the DMA 800 reads out a prescribed quantity of read data from the data storage memory 117, the data calculated by converting a prescribed quantity of the read data in accordance with a prescribed algorithm is compared with the converted data in the check code appended to the prescribed quantity of read data, and depending on the result of this comparison, prescribed data indicating that there is an error in the read data is written into the check code. Thereupon, if prescribed data indicating that there is an error in the read data has been written into the check code appended to each prescribed quantity of read data, then the host I/F control LSI 115 interrupts the transmission of the read data to the information processing device 200.

Here, each time the DMA 800 reads out a prescribed quantity of read data from the data storage memory 117, the data calculated by converting a prescribed quantity of the read data in accordance with a prescribed algorithm is compared with the converted data in the check code appended to the prescribed quantity of read data, and the prescribed data indicating that there is an error in the read data which is written into the check code, depending on the result of this comparison, is the data indicating the presence of an error contained in the error indicator data described above, and it may be taken to be "0", for example.

By adopting this method, the host I/F control LSI 115 is able to identify if there is an error in the read data transmitted by the DMA 800. Thereby, the host I/F control LSI 115 is able to prevent data containing an error from being transmitted to the information processing device 200.

Moreover, the following beneficial effects are also obtained. Namely, the host I/F control LSI 115 and the DMA 800 are mutually connected by means of a PCI bus, as described above. According to the specifications of the PCI bus, once the host I/F control LSI 115 has issued a data read request, then that read request cannot be withdrawn. In other words, according to the PCI bus specifications, once a read request has been issued, the host I/F control LSI 115 waits continuously, for as long as necessary, until data corresponding to that read request is received, or until the PCI bus is reset. Therefore, even if the DMA 800 has detected that there is an error in the read data read out from the data storage memory 117, data of some kind must be transmitted to the host I/F control LSI 115. Failing this, the host I/F control LSI 115 will continue to wait, endlessly, for data to be transmitted. However, if the read data read out from the data storage memory 117 is transmitted to the host I/F control LSI 115, then the host I/F control LSI 115 will transmit data containing an error to the information processing device 200. In this case, the information processing device 200 will execute the program 220A, without being able to detect that there is an error in the read data. On the other hand, if the PCI bus is reset in order to prevent read data containing an error that has been read out from the data storage memory 117, from being transmitted to the host I/F control LSI 115, then this means that all the read data and write data being transmitted on that PCI bus will be reset as well.

Therefore, in the present embodiment, as described above, it is devised that each time the DMA 800 reads out a prescribed quantity of read data from the data storage memory 117, the data calculated by converting a prescribed quantity of the read data in accordance with a prescribed algorithm is compared with the converted data in the check code appended to the prescribed quantity of read data, and depending on the result of this comparison, prescribed data indicating that there is an error in the read data is written into the check code. By so doing, it becomes possible to avoid situations where a host I/F control LSI 115 that has already issued a read request continues to wait endlessly for the read data to be transmitted, in addition to which, it is possible to interrupt the transmission of read data containing an error to the information processing device 200, by means of the host I/F control LSI 115 detecting that prescribed data indicating that the read data contains an error has been written into the check code appended to each prescribed quantity of read data.

Next, an overview of data transfer in a mainframe channel control section 110 provided in the storage control device 100 relating to the present embodiment is described with reference to FIG. 22 to FIG. 26. As mentioned above, the storage control device 100 and storage drive device 300 connected to a mainframe computer are required to carry out data input and output processing in a short period of time, in response to data input and output requests from the mainframe computer. Therefore, the data transfer processing in the mainframe channel control section 110 differs from the data transfer processing in an open channel control section.

Figure 23:
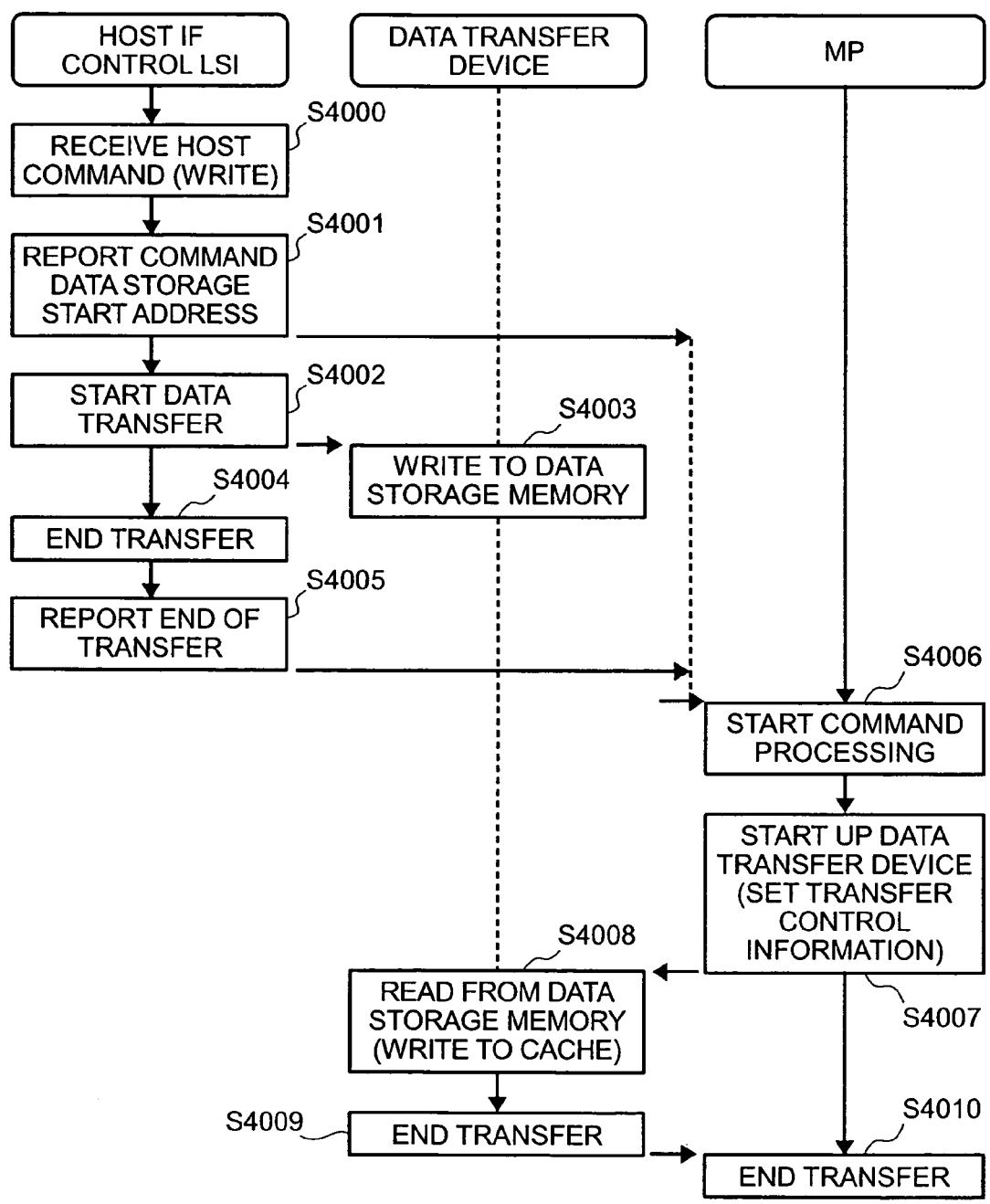
FIG. 23 is a flowchart showing the sequence of data write processing relating to the present embodiment.
Figure 24:
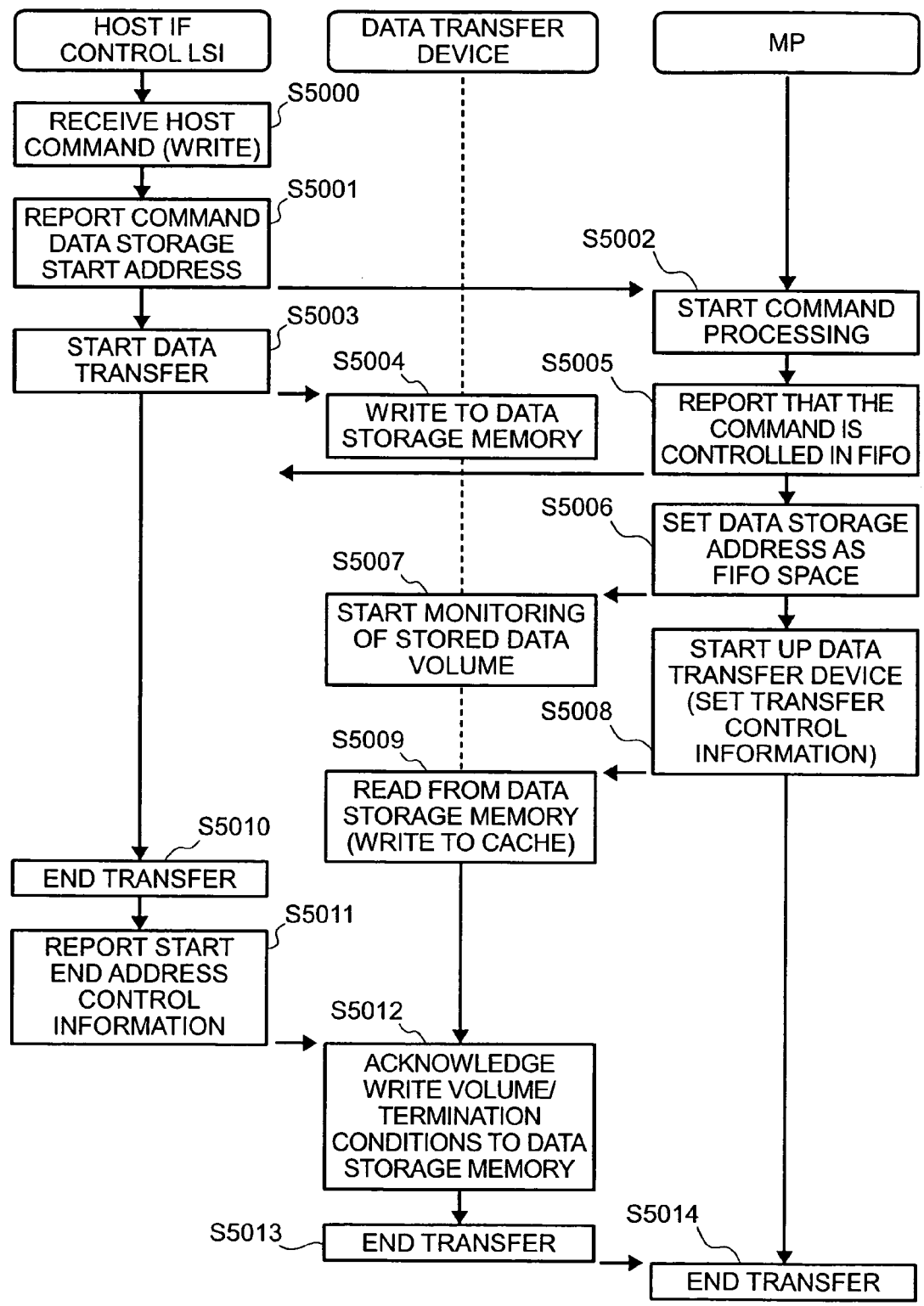
FIG. 24 is a flowchart showing the sequence of data write processing relating to the present embodiment.

Firstly, FIG. 23 and FIG. 24 show flowcharts illustrating the sequence of processing carried out in a case where the host I/F control LSI 115 has received a data write request from an information processing device 200. FIG. 23 is a flowchart in a case where write data transmitted by the information processing device 200 is all written to a data storage memory 117, and is then transmitted to the cache memory 130. FIG. 24 is a flowchart of a case where write data transmitted by the information processing device 200 is written to the data storage memory 117, whilst at the same time, transmission to the cache memory 130 is started before all of the write data has been written to the data storage memory 117.

Firstly, in FIG. 23, when the host I/F control LSI 115 receives a data write request from the information processing device 200 (S4000), the host I/F control LSI 115 starts to transmit information indicating a storage position for the write data in the data storage memory 117, and the write data itself, to the memory controller 840 (S4001). This is because, in the mainframe channel control section 110, the storage position of the data in the data storage memory 117 is controlled by the host I/F control LSI 115. By this means, if the host I/F control LSI 115 has received a data write request from the information processing device 200, then no communications with the processor 119 are necessary, and hence the writing of write data to the data storage memory 117 can be started earlier, by a corresponding amount.

On the other hand, the host I/F control LSI 115 transmits storage position information containing information indicating the storage position of the write data in the data storage memory 117, to processor 119 (S4001). There may be cases where communications cannot be established between the host I/F control LSI 115 and the processor 119, for instance, due to the fact that the processor 119 is carrying out other information processing, but even in cases such as these, the memory controller 840 starts writing the write data to the data storage memory 117, in accordance with the information indicating the storage position of the write data in the data storage memory 117, that has been written to the write address register 842 (S4002, S4003). If writing of all of the write data to the data storage memory 117 has been completed, without communications having been established between the host I/F control LSI 115 and the processor 119 (S4004), then the host I/F control LSI 115 transmits a transfer end report to the processor 119 (S4005). This transfer end report includes information indicating the storage position of the write data in the data storage memory 117, and information indicating the final write address of the write data in the data storage memory 117.

When the processor 119 receives storage position information (S4006), it transmits data transfer information to the DMA 800 (S4007).

The DMA 800 then transmits a read request for the write data written in the data storage memory 117, to the memory controller 840, on the basis of data transfer information. More specifically, the DMA 800 writes the storage address of the write data to the read address register 843 of the memory controller 840, and instructs read-out of the write data.

The memory controller 840 starts to read out the write data from the data storage memory 117 (S4008), and the DMA 800 starts to transfer the write data that is to be read out, from the data storage memory 117, to the cache memory 130. When the data transfer has been completed, the DMA 800 transmits a transfer end report to the processor 119 (S4009). Thereby, the data transfer to the cache memory 130 is completed (S4010).

Next, in FIG. 24, when the host I/F control LSI 115 receives a data write request from the information processing device 200 (S5000), the host I/F control LSI 115 starts to transmit information indicating a storage position for the write data in the data storage memory 117, and the write data itself, to the memory controller 840 (S5001). Thereupon, the host I/F control LSI 115 transmits storage position information containing information indicating the storage position of the write data in the data storage memory 117, to processor 119 (S5001). Here, if communications have been established between the host I/F control LSI 115 and the processor 119, then the processor 119 receives storage position information containing information indicating the storage position for the write data in the data storage memory 117 (S5002).

On the other hand, the memory controller 840 starts to write the write data to the data storage memory 117, in accordance with the information indicating the storage position of the write data in the data storage memory 117, which has been written to the write address register 842 (S5003, S5004).

The processor 119 reports to the host I/F control LSI 115 that the data transfer is to be carried out via the FIFO (S5005), and it transmits data transfer information to the DMA 800 (S5006, S5008). The data storage address indicated in S5006 can be set to a FIFO space by setting the data transfer information in such a manner that information indicating that the data storage memory 117 is to be used as a FIFO memory is written into the FIFO settings register 824. The DMA 800 carries out monitoring of the data storage volume (S5007), by means of the TOP address register 826 and the BOTTOM address register 827, and it starts reading from the data storage memory 117 if the data storage volume has reached the transfer unit value (S5009). In specific terms, data is read from the data storage memory 117 by means of the DMA 800 transmitting a read request for the write data that has been written to the data storage memory 117, on the basis of the data transfer information, to the memory controller 840, whereupon the memory controller 840 starts to read out the write data from the data storage memory 117.

If writing of all of the write data from the host I/F control LSI 115 to the data storage memory 117 has been completed (S5010), then the host I/F control LSI 115 transmits storage position information containing information indicating the final write address of the write data in the data storage memory 117, and control information, to the processor 119 (S5011). The processor 119 transmits data transfer information containing the information indicating the final write address of the write data in the data storage memory 117, and control information, to the DMA 800. The DMA 800 then writes the information indicating the final write address to the final data storage address register 828, and it writes the control information to the control information storage register 829. The storage position information containing information indicating the final write address of the write data in the data storage memory 117, and the control information, may also be transmitted direction from the host I/F control LSI 115 to the DMA 800, as illustrated in FIG. 24. When the DMA 800 confirms that the data transfer from the data storage memory 117 to the cache memory 130 has been completed, on the basis of the final data storage address register 828 and the control information storage register 829 (S5012), then it transmits a transfer end report to the processor 119 (S5013). Thereby, the data transfer to the cache memory 130 is completed (S5014).

Figure 25:
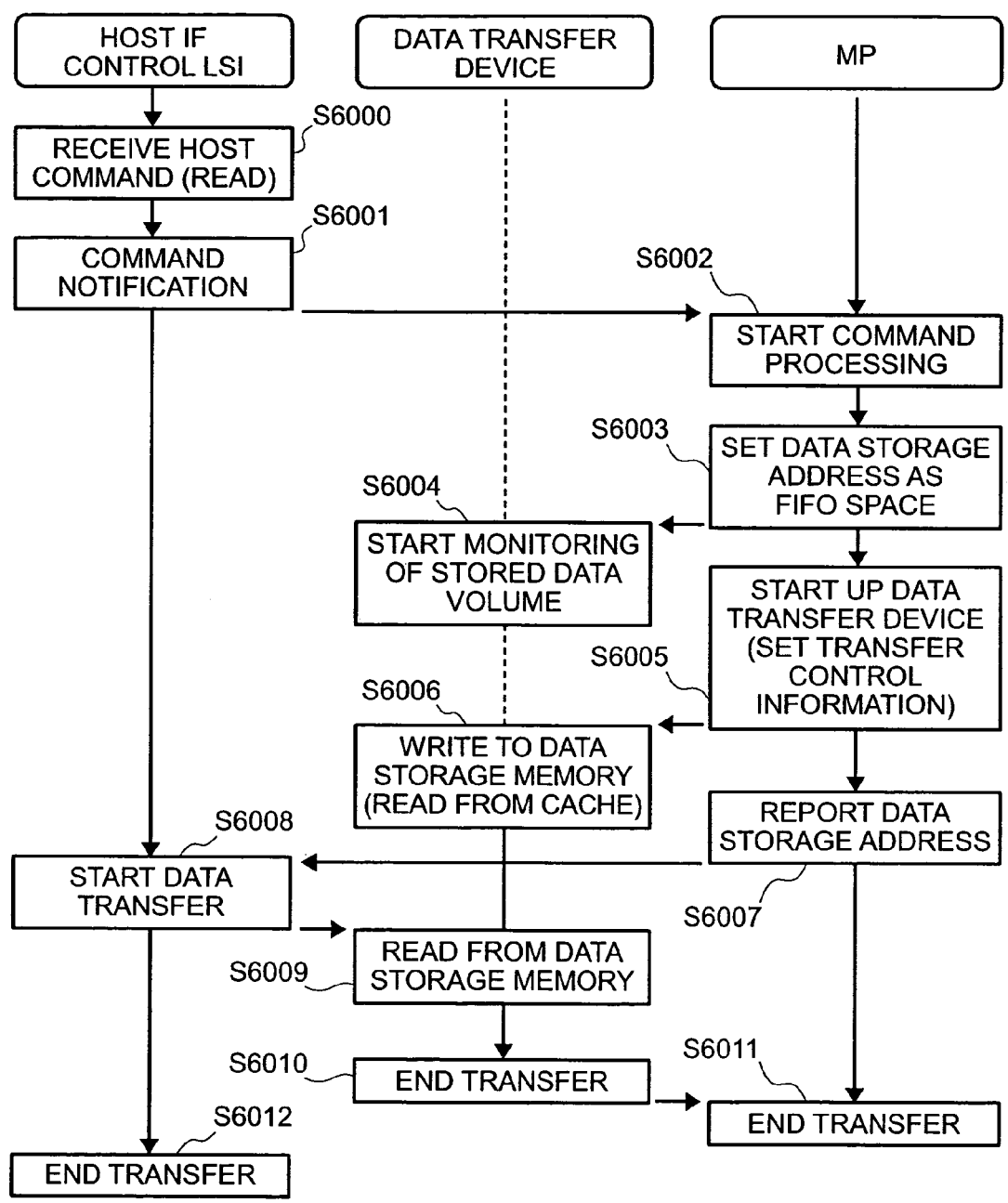
FIG. 25 is a flowchart showing the sequence of data read processing relating to the present embodiment.

Next, FIG. 25 is a flowchart showing the sequence of processing carried out in a case where the host I/F control LSI 115 has received a data read request from an information processing device 200.

Firstly, if the host I/F control LSI 115 receives a data read request from the information processing device 200 (S6000), then the host I/F control LSI 115 transmits storage position information containing information indicating the storage position of the read data in the data storage memory 117, to the processor 119 (S6001). When the processor 119 receives storage position information (S6002), it transmits data transfer information to the DMA 800 (S6003, S6005). The data storage address indicated in S6003 can be set to a FIFO space by setting the data transfer information in such a manner that information indicating that the data storage memory 117 is to be used as a FIFO memory is written into the FIFO settings register 824. The DMA 800 monitors the volume of data store (S6004), by means of the TOP address register 826 and the BOTTOM address register 827, and it starts reading out of read data from the cache memory 130 on the basis of the data transfer information. The DMA 800 starts transmission of information indicating a storage position for the read data in the data storage memory 117, and the read data itself, to the memory controller 840. The memory controller 840 starts to write the read data to the data storage memory 117 (S6006).

On the other hand, when the processor 119 has reported to the host I/F control LSI 115 that the read data has started to be written to the data storage memory 117 (S6007), then the host I/F control LSI 115 transmits a read request for the read data written into the data storage memory 117, to the memory controller 840, and the memory controller 840 starts to read out the read data from the data storage memory 117 (S6009). The host I/F control LSI 115 then transmits the read data that is read out from the data storage memory 117, to the information processing device 200.

When the host I/F control LSI 115 and the DMA 800 have respectively completed data transfer, they transmit a transfer end report to the processor 119 (S6010, S6012). Thereby, the data transfer to the information processing device 200 is completed (S6011).

Furthermore, in the mainframe channel control section 110 relating to the present embodiment, when data is transferred between the host I/F control LSI 115 and the cache memory 130, it is sought to improve reliability by appending a check code (security code) to the transferred data.

If data is to be transferred from the host I/F control LSI 115 to the cache memory 130, when the host I/F control LSI 115 transmits write data, a check code, containing converted data calculated by converting a prescribed quantity of write data in accordance with a prescribed algorithm and error indicator data which indicates whether or not there is an error in the prescribed quantity of write data, is appended to each prescribed quantity of write data. Thereupon, when the DMA 800 transfers the write data from the data storage memory 117 to the cache memory 130, for each prescribed quantity of write data, the data calculated by converting the prescribed quantity of write data in accordance with the prescribed algorithm is compared with the converted data in the check code applied to the prescribed quantity of write data, and transfer of write data to the cache memory 130 is interrupted in accordance with the result of this comparison.

Furthermore, if data is to be transferred from the cache memory 130 to the host I/F control LSI 115, when the DMA 800 transmits read data from the cache memory 130 to the data storage memory 117, a check code, containing converted data calculated by converting a prescribed quantity of read data in accordance with a prescribed algorithm and error indicator data which indicates whether or not there is an error in the prescribed quantity of read data, is appended to each prescribed quantity of read data. Each time the DMA 800 reads out a prescribed quantity of read data from the data storage memory 117, the data calculated by converting a prescribed quantity of the read data in accordance with a prescribed algorithm is compared with the converted data in the check code appended to the prescribed quantity of read data, and depending on the result of this comparison, prescribed data indicating that there is an error in the read data is written into the check code. Thereupon, if prescribed data indicating that there is an error in the read data has been written into the check code appended to each prescribed quantity of read data, then the host I/F control LSI 115 interrupts the transmission of the read data to the information processing device 200.

By adopting this method, the host I/F control LSI 115 is able to identify if there is an error in the read data transmitted by the DMA 800. Thereby, the host I/F control LSI 115 is able to prevent data containing an error from being transmitted to the information processing device 200.

Figure 26:
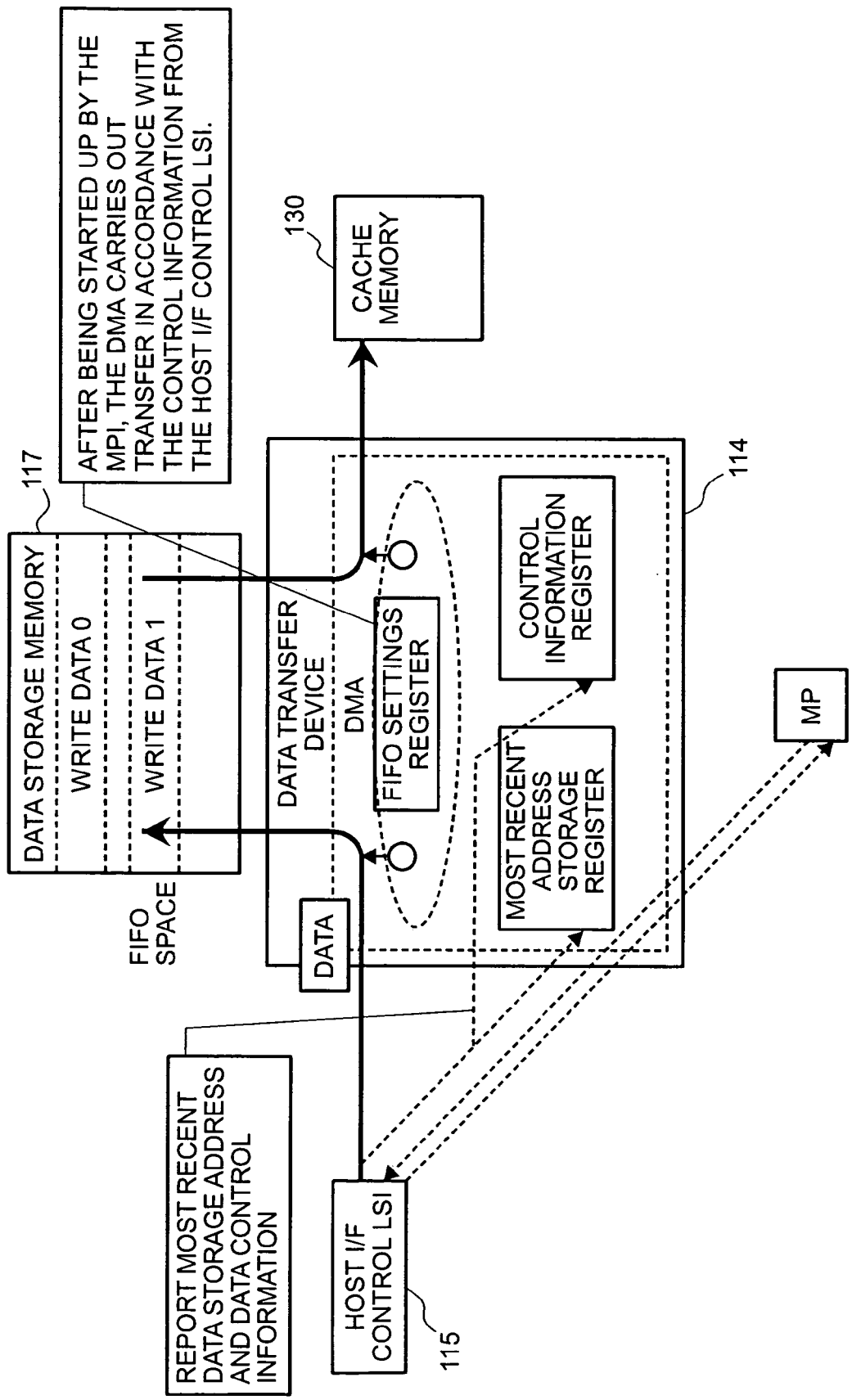
FIG. 26 is a diagram for explaining data transfer relating to the present embodiment.

As described above, in the case of a mainframe channel control section 110, there may be situations in which writing of all of the write data from the host I/F control LSI 115 to the data storage memory 117 has been completed without the processor 119 being aware of same, or situations in which transmission of the write data from the information processing device 200 has ended, without having reached the write data length indicated in the data write request that was transmitted by the information processing device 200. In cases such as these, if information indicating the relevant situation is not reported to the DMA 800, then the DMA 800 will continue to wait, endlessly, for further write data to be transmitted from the host I/F control LSI 115. In order to avoid this, as illustrated in FIG. 26, the data transfer device 114 relating to the present embodiment is provided with a final data storage address register 828 and a control information storage register 829. The final data storage address register 828 is written with information indicating the final write address of the write data, when all of the write data transmitted by the information processing device 200 has been written to the data storage memory 117 by the host I/F control LSI 115. Furthermore, if the host I/F control LSI 115 receives from the information processing device 200 information indicating that only write data that is shorter than the write data length indicated in the data write request transmitted by the information processing device 200 is to be transmitted, then control information indicating this fact is written to the control information storage register 829.

As described above, in the storage control device 100 relating to the present embodiment, by providing an open channel control section 110 and a mainframe channel control section 110, it is possible to provide two storage control devices 100 of different data input and output performance characteristics, to the information processing devices 200. In other words, an open information processing device 200 and a mainframe information processing device 200 have differences in the characteristics that they require in the storage system 600, in that relative cost tends to be emphasized in the case of an open device and relative performance tends to be emphasized in the case of a mainframe device, but here it is possible to offer a storage system 600 which is capable of responding flexibly to either type of requirement. In other words, it is possible to provide suitable data input and output performance to the information processing devices 200, in accordance with the data input and output performance of the storage control device 100 required by the information processing devices 200.

Moreover, the channel control section 110 provided in the storage control device 100 relating to the present embodiment is able to use the data storage memory 117 as a FIFO memory. Here, the data storage memory 117 is constituted as a separate circuit from the data transfer device 114. Thereby, it is possible to constitute one or a plurality of FIFO memories, as necessary, having a storage capacity of a size that meets requirements.

By this means, in the storage control device 100 of the present embodiment, it is possible to process data input and output requests transmitted by the information processing device 200, at higher speed. In other words, it is possible to increase the speed of data reading and writing operations. Furthermore, it is also possible to receive data input/output requests of large volume from a plurality of information processing devices 200, and to read or write data accordingly.

Moreover, in the storage control device 100 relating to the present embodiment, when data is transferred between the host I/F control LSI 115 and the cache memory 130, improved reliability can be sought by appending a check code (security code) to the transferred data.

A preferred embodiment for carrying out the present invention was described above, but this embodiment is intended to facilitate understanding of the present invention, and it is not intended to limit the possible interpretation of the present invention. The present invention may be modified or improved, without deviating from the essence of the invention, and the present invention includes all such equivalent proposals.

(Description of the Symbols)
100 storage control device
110 channel control section
114 data transfer device
115 host I/F control LSI
117 data storage memory
119 processor
120 shared memory
130 cache memory
140 disk control section
150 internal connection section
160 management terminal
200 information processing device
300 storage drive device
500 SAN
600 storage system
720 check code
721 tag
722 converted data
800 DMA
810 DMA control section
820 transfer source address register
821 transfer destination address register
822 request transfer length register
823 transfer unit register
824 FIFO settings register
825 transfer direction register
826 Top address register
827 Bottom address register
828 final data storage address register
829 control information storage register
840 memory controller
841 memory control section
842 write address register
843 read address register

What is claimed is:

1. A storage control device comprising:
a first channel control section for receiving data input and output requests from a first information processing device, and transmitting and receiving data, to and from said first information processing device;
a second channel control section for receiving data input and output requests from a second information processing device, and transmitting and receiving data, to and from said second information processing device;
a disk control section for reading and writing data, from and to a storage volume storing data, in accordance with said data input and output requests; and a cache memory for storing data transmitted and received between said first channel control section, said second channel control section and said disk control section;
wherein said first channel control section comprises:
a first memory;
a first input/output control section for receiving data input and output requests from said first information processing device and controlling transmission and reception of data between said first memory and said first information processing device;
a first processor for controlling said first memory and said cache memory; and
a first data transfer device having a first memory controller for reading and writing data from and to said first memory, and a first data transfer control section for controlling data transfer between said first memory and said cache memory;
and said second channel control section comprises:
a second memory;
a second input/output control section for controlling said second memory, receiving data input and output requests from said second information processing device and controlling transmission and reception of data between said second memory and said second information processing device;
a second processor for controlling said cache memory;
a second data transfer device having a second memory controller for reading and writing data from and to said second memory, and a second data transfer control section for controlling data transfer between said second memory and said cache memory;
and in said first channel control section;
in cases where said data input or output request received by said first input/output control section from said first information processing device is a first data write request;
said first input/output control section transmits said first data write request to said first processor;
said first processor transmits first storage position information containing information indicating a storage position in said first memory for the first write data transmitted by said first information processing device, to said first input/output control section;
said first input/output control section starts to transmit information indicating the storage position in said first memory for said first write data, and said first write data, to said first memory controller;
said first memory controller starts to write said first write data into said first memory;
said first processor transmits first data transfer information containing information indicating the storage position in said first memory of said first write data, and information indicating a storage position in said cache memory for said first write data, to said first data transfer control section;
said first data transfer control section transmits a read request for said first write data written to said first memory, to said first memory controller, on the basis of said first data transfer information;
said first memory controller starts to read out said first write data from said first memory; and
said first data transfer control section starts to transfer said first write data read out from said first memory, to said cache memory;
and in said second channel control section;

in cases where said data input and output request received by said second input/output control section from said second information processing device is a second data write request;

said second input/output control section starts to transmit information indicating a storage position in said second memory for said second write data transmitted by said second information processing device, and said second write data, to said second memory controller;

said second memory controller starts to write said second write data into said second memory;

said second input/output control section transmits second storage position information containing information indicating the storage position in said second memory for the second write data, to said second processor;

said second processor transmits second data transfer information containing information indicating the storage position in said second memory of said second write data, and information indicating a storage position in said cache memory for said second write data, to said second data transfer control section;

said second data transfer control section transmits a read request for said second write data written to said second memory, to said second memory controller, on the basis of said second data transfer information;

said second memory controller starts to read out said second write data from said second memory; and said second data transfer control section starts to transfer said second write data read out from said second memory, to said cache memory.

2. The storage control device according to claim 1, wherein:

in said first channel control section;

in cases where said data input or output request received by said first input/output control section from said first information processing device is a first data read request;

said first input/output control section transmits said first data read request to said first processor;

said first processor transmits third data transfer information containing information indicating the storage position in said cache memory of the first read data to be transmitted to said first information processing device, and information indicating a storage position in said first memory for said first read data, to said first data transfer control section;

said first data transfer control section starts to read out said first read data from said cache memory, on the basis of said third data transfer information;

said first data transfer control section starts to transmit information indicating the storage position in said first memory for said first read data, and said first read data, to said first memory controller;

said first memory controller starts to write said first read data into said first memory;

said first processor transmits third storage position information containing information indicating the storage position in said first memory of the first read data, to said first input/output control section;

said first input/output control section transmits a read request for said first read data written to said first memory, to said first memory controller, on the basis of said third storage position information;

said first memory controller starts to read out said first read data from said first memory; and said first input/output control section transmits said first read data read out from said first memory to said first information processing device;

and in said second channel control section;

in cases where said data input or output request received by said second input/output control section from said second information processing device is a second data read request;

said second input/output control section transmits fourth storage position information containing information indicating a storage position in said second memory for the second read data to be transmitted to said second information processing device, to said second processor;

said second processor transmits fourth data transfer information containing information indicating the storage position in said cache memory of said second read data, and information indicating a storage position in said second memory for said second read data, to said second data transfer control section;

said second data transfer control section starts to read out said second read data from said cache memory, on the basis of said fourth data transfer information;

said second data transfer control section starts to transmit information indicating the storage position in said second memory for said second read data, and said second read data, to said second memory controller;

said second memory controller starts to write said second read data into said second memory;

said second input/output control section transmits a read request for said second read data written to said second memory, to said second memory controller;

said second memory controller starts to read out said second read data from said second memory; and said second input/output control section transmits said second read data read out from said second memory, to said second information processing device.

3. The storage control device according to claim 2, wherein:

in said first channel control section;

in cases where said data input or output request received by said first input/output control section from said first information processing device is a first data read request;

said first input/output control section transmits said first data read request to said first processor;

said first processor transmits said third data transfer information to said first data transfer control section;

said first data transfer control section starts to read out said first read data from said cache memory, on the basis of said third data transfer information;

said first data transfer control section starts to transmit information indicating the storage position in said first memory for said first read data, and said first read data, to said first memory controller;

when transmitting said first read data, said first data transfer control section appends, to each prescribed quantity of said first read data, a check code containing converted data calculated by converting said prescribed quantity of first read data in accordance with a prescribed algorithm, and error indicator data indicating whether or not there is an error in said prescribed quantity of first read data;

said first memory controller starts to write said first read data and said check code into said first memory;

said first processor transmits said third storage position information to said first input/output control section;

said first input/output control section transmits a read request for said first read data and said check code written to said first memory, to said first memory controller, on the basis of said third storage position information;

said first memory controller starts to read out said first read data and said check code from said first memory;

each time said prescribed quantity of first read data is read out, said first data transfer control section compares data calculated by converting said prescribed quantity of first read data in accordance with said prescribed algorithm, with said converted data in said check code appended to said prescribed quantity of first read data, and writes prescribed data indicating that there is an error in said first read data, into said check code, depending on the result of this comparison;

said first input/output control section transmits said first read data read out from said first memory to said first information processing device; and said first input/output control section halts transmission of said first read data to said first information processing device, if said prescribed data indicating that there is an error in said first read data has been written into said check code appended to each of said prescribed quantity of first read data;

and in said second channel control section;

in cases where said data input or output request received by said second input/output control section from said second information processing device is a second data read request;

said second input/output control section transmits said fourth storage position information to said second processor;

said second processor transmits said fourth data transfer information to said second data transfer control section;

said second data transfer control section starts to read out said second read data from said cache memory, on the basis of said fourth data transfer information;

said second data transfer control section starts to transmit information indicating the storage position in said second memory for said second read data, and said second read data, to said second memory controller;

when transmitting said second read data, said second data transfer control section appends, to each prescribed quantity of said second read data, a check code containing converted data calculated by converting said prescribed quantity of second read data in accordance with a prescribed algorithm, and error indicator data indicating whether or not there is an error in said prescribed quantity of second read data;

said second memory controller starts to write said second read data and said check code into said second memory;

said second input/output control section transmits a read request for said second read data and said check code written to said second memory, to said second memory controller;

said second memory controller starts to read out said second read data and said check code from said second memory;

each time said prescribed quantity of second read data is read out, said second data transfer control section compares data calculated by converting said prescribed quantity of second read data in accordance with said prescribed algorithm, with said converted data in said check code appended to said prescribed quantity of second read data, and writes prescribed data indicating that there is an error in said second read data, into said check code, depending on the result of this comparison;

said second input/output control section transmits said second read data read out from said second memory to said second information processing device; and said second input/output control section halts transmission of said second read data to said second information processing device, if said prescribed data indicating that there is an error in said second read data has been written into said check code appended to each of said prescribed quantity of second read data.

4. The storage control device according to claim 1, wherein:

in said first channel control section;

in cases where said data input or output request received by said first input/output control section from said first information processing device is a first data write request;

said first input/output control section transmits said first data write request to said first processor;

said first processor transmits said first storage position information to said first input/output control section;

said first input/output control section starts to transmit information indicating the storage position in said first memory for said first write data, and said first write data, to said first-memory controller;

when transmitting said first write data, said first input/output control section appends, to each prescribed quantity of said first write data, a check code containing converted data calculated by converting said prescribed quantity of first write data in accordance with a prescribed algorithm, and error indicator data indicating whether or not there is an error in said prescribed quantity of first write data;

said first memory controller starts to write said first write data and said check code into said first memory;

said first processor transmits said first data transfer information to said first data transfer control section;

said first data transfer control section transmits a read request for said first write data and said check code written to said first memory, to said first memory controller, on the basis of said first data transfer information;

said first memory controller starts to read out said first write data and said check code from said first memory;

said first data transfer control section starts to transfer said first write data read out from said first memory, to said cache memory; and when transferring said first write data, for each of said prescribed quantity of first write data, said first data transfer control section compares data calculated by converting said prescribed quantity of first write data in accordance with said prescribed algorithm, with said converted data in said check code appended to said prescribed quantity of first write data, and halts transfer of said first write data to said cache memory in accordance with the results of said comparison;

and in said second channel control section;

in cases where said data input and output request received by said second input/output control section from said second information processing device is a second data write request;

said second input/output control section starts to transmit information indicating the storage position in said second memory for said second write data, and said second write data, to said second memory controller;

when transmitting said second write data, said second input/output control section appends, to each prescribed quantity of said second write data, a check code containing converted data calculated by converting said prescribed quantity of second write data in accordance with a prescribed algorithm, and error indicator data indicating whether or not there is an error in said prescribed quantity of second write data;

said second memory controller starts to write said second write data and said check code into said second memory;

said second input/output control section transmits said second storage position information to said second processor;

said second processor transmits said second data transfer information to said second data transfer control section;

said second data transfer control section transmits a read request for said second write data and said check code written to said second memory, to said second memory controller, on the basis of said second data transfer information;

said second memory controller starts to read out said second write data and said check code from said second memory;

said second data transfer control section starts to transfer said second write data read out from said second memory, to said cache memory; and when transferring said second write data, for each of said prescribed quantity of second write data, said second data transfer control section compares data calculated by converting said prescribed quantity of second write data in accordance with said prescribed algorithm, with said converted data in said check code appended to said prescribed quantity of second write data, and halts transfer of said second write data to said cache memory in accordance with the results of said comparison.

5. The storage control device according to claim 1, wherein:

when said second input/output control section transmits said second storage position information to said second processor, if the writing of said second write data to said second memory has been completed;

information indicating the last write address in said second memory of said second write data, is included in said second storage position information; and information indicating the last write address in said second memory of said second write data, is included in said second data transfer information.

6. The storage control device according to claim 1, wherein:

said first information processing device is an open information processing device; and said second information processing device is a mainframe information processing device.

7. A storage control device comprising:

a channel control section for receiving data input and output requests from an information processing device, and transmitting and receiving data, to and from said information processing device;

a disk control section for reading and writing data, from and to a storage volume storing data, in accordance with said data input and output requests; and a cache memory for storing data transmitted and received between said channel control section and said disk control section;

wherein said channel control section comprises:

a memory;

an input/output control section for receiving data input and output requests from said information processing device and controlling transmission and reception of data between said memory and said information processing device;

a processor for controlling said memory and said cache memory; and a data transfer device having a memory controller for reading and writing data from and to said memory, and a plurality of data transfer control sections for controlling the transfer of data between said memory and said cache memory; wherein in cases where said input/output control section has received a first data write request and a second data write request from said information processing device;

said input/output control section transmits said first data write request to said processor;

said input/output control section transmits said second data write request to said processor;

said processor transmits first storage position information containing information indicating a storage position in said memory for the first write data corresponding to said first data write request transmitted by said information processing device, and second storage position information containing information indicating a storage position in said memory for the second write data corresponding to said second data write request transmitted by said information processing device, to said input/output control section;

said input/output control section starts to transmit information indicating the storage position in said memory for said first write data, and said first write data, to said memory controller;

said memory controller starts to write said first write data into said memory;

said processor transmits first data transfer information containing information indicating the storage position in said memory of said first write data, and information indicating a storage position in said cache memory for said first write data, to a first of said data transfer control sections;

said first data transfer control section transmits a read request for said first write data written to said memory, to said memory controller, on the basis of said first data transfer information;

said memory controller starts to read out said first write data from said memory;

said first data transfer control section starts to transfer said first write data read out from said memory, to said cache memory;

said input/output control section starts to transmit information indicating the storage position in said memory for said second write data, and said second write data, to said memory controller;

said memory controller starts to write said second write data into said memory;

said processor transmits second data transfer information containing information indicating the storage position in said memory of said second write data, and information indicating a storage position in said cache memory for said second write data, to a second of said data transfer control sections;

said second data transfer control section transmits a read request for said second write data written to said memory, to said memory controller, on the basis of said second data transfer information;

said memory controller starts to read out said second write data from said memory; and said second data transfer control section starts to transfer said second write data read out from said memory, to said cache memory.

8. The storage control device according to claim 7, wherein:

in cases where said input/output control section has received said first data write request and said second data write request from said information processing device;

said input/output control section transmits said first data write request to said processor;

said input/output control section transmits said second data write request to said processor;

said processor transmits said first storage position information and said second storage position information to said input/output control section;

said input/output control section starts to transmit information indicating the storage position in said memory for said first write data, and said first write data, to said memory controller;

when transmitting said first write data, said input/output control section appends, to each prescribed quantity of said first write data, a check code containing converted data calculated by converting said prescribed quantity of first write data in accordance with a prescribed algorithm, and error indicator data indicating whether or not there is an error in said prescribed quantity of first write data;

said memory controller starts to write said first write data and said check code into said memory;

said processor transmits said first data transfer information to said first data transfer control section;

said first data transfer control section transmits a read request for said first write data and said check code written to said memory, to said memory controller, on the basis of said first data transfer information;

said memory controller starts to read said first write data and said check code from said memory;

said first data transfer control section starts to transfer said first write data read out from said memory, to said cache memory;

when transferring said first write data, for each of said prescribed quantity of first write data, said first data transfer control section compares data calculated by converting said prescribed quantity of first write data in accordance with said prescribed algorithm, with said converted data in said check code appended to said prescribed quantity of first write data, and halts transfer of said first write data to said cache memory in accordance with the results of said comparison;

said input/output control section starts to transmit information indicating the storage position in said memory for said second write data, and said second write data, to said memory controller;

when transmitting said second write data, said input/output control section appends, to each prescribed quantity of said second write data, a check code containing converted data calculated by converting said prescribed quantity of second write data in accordance with a prescribed algorithm, and error indicator data indicating whether or not there is an error in said prescribed quantity of second write data;

said memory controller starts to write said second write data and said check code into said memory;

said processor transmits said second data transfer information to said second data transfer control section;

said second data transfer control section transmits a read request for said second write data and said check code written to said memory, to said memory controller, on the basis of said second data transfer information;

said memory controller starts to read said second write data and said check code from said memory;

said second data transfer control section starts to transfer said second write data read out from said memory, to said cache memory; and when transferring said second write data, for each of said prescribed quantity of second write data, said second data transfer control section compares data calculated by converting said prescribed quantity of second write data in accordance with said prescribed algorithm, with said converted data in said check code appended to said prescribed quantity of write data, and halts transfer of said second write data to said cache memory in accordance with the results of said comparison.

9. A storage control device comprising:

a first channel control section for receiving data input and output requests from a first information processing device, and transmitting and receiving data, to and from said first information processing device;

a second channel control section for receiving data input and output requests from a second information processing device, and transmitting and receiving data, to and from said second information processing device;

a disk control section for reading and writing data, from and to a storage volume storing data, in accordance with said data input and output requests; and a cache memory for storing data transmitted and received between said first channel control section, said second channel control section and said disk control section;

wherein said first channel control section comprises:

a first memory;

a first input/output control section for receiving data input and output requests from said first information processing device and controlling transmission and reception of data between said first memory and said first information processing device;

a first processor for controlling said first memory and said cache memory; and a first data transfer device having a first memory controller for reading and writing data from and to said first memory, and a plurality of first data transfer control sections for controlling data transfer between said first memory and said cache memory;

and said second channel control section comprises:

a second memory;

a second input/output control section for controlling said second memory, receiving data input and output requests from said second information processing device and controlling transmission and reception of data between said second memory and said second information processing device;

a second processor for controlling said cache memory; and a second data transfer device having a second memory controller for reading and writing data from and to said second memory, and a second data transfer control section for controlling data transfer between said second memory and said cache memory;

and in said first channel control section;

in cases where said first input/output control section has received a first data write request and a second data write request from said first information processing device;

said first input/output control section transmits said first data write request to said first processor;

said first input/output control section transmits said second data write request to said first processor;

said first processor transmits first storage position information containing information indicating a storage position in said first memory for the first write data corresponding to said first data write request transmitted by said first information processing device, and second storage position information containing information indicating a storage position in said first memory for the second write data corresponding to said second data write request transmitted by said first information processing device, to said first input/output control section;

said first input/output control section starts to transmit information indicating the storage position in said first memory for said first write data, and said first write data, to said first memory controller;

said first memory controller starts to write said first write data into said first memory;

said first processor transmits first data transfer information containing information indicating the storage position in said first memory of said first write data, and information indicating a storage position in said cache memory for said first write data, to any one of said first data transfer control sections;

said first data transfer control section, to which said first data transfer information has been transmitted, transmits a read request for said first write data written to said first memory, to said first memory controller, on the basis of said first data transfer information;

said first memory controller starts to read out said first write data from said first memory;

said first data transfer control section, to which said first data transfer information was transmitted, starts to transfer said first write data read out from said first memory, to said cache memory;

said first input/output control section starts to transmit information indicating the storage position in said first memory for said second write data, and said second write data, to said first memory controller;

said first memory controller starts to write said second write data into said first memory;

said first processor transmits second data transfer information containing information indicating the storage position in said first memory of said second write data, and information indicating a storage position in said cache memory for said second write data, to another of said first data transfer control sections which is different to said first data transfer control section to which said first data transfer information was transmitted;

said first data transfer control section, to which said second data transfer information has been transmitted, transmits a read request for said second write data written to said first memory, to said first memory controller, on the basis of said second data transfer information;

said first memory controller starts to read out said second write data from said first memory; and said second data transfer control section, to which said first data transfer information was transmitted, starts to transfer said second write data read out from said first memory, to said cache memory; and and in said second channel control section;

in cases where said data input and output request received by said second input/output control section from said second information processing device is a third data write request;

said second input/output control section starts to transmit information indicating a storage position in said second memory for the third write data corresponding to said third data write request transmitted by said second information processing device, and said third write data, to said second memory controller;

said second memory controller starts to write said third write data into said second memory;

said second input/output control section transmits third storage position information containing information indicating the storage position in said second memory for the third write data, to said second processor;

said second processor transmits third data transfer information containing information indicating the storage position in said second memory of said third write data, and information indicating a storage position in said cache memory for said third write data, to said second data transfer control section;

said second data transfer control section transmits a read request for said third write data written to said second memory, to said second memory controller, on the basis of said third data transfer information;

said second memory controller starts to read out said third write data from said second memory; and said second data transfer control section starts to transfer said third write data read out from said second memory, to said cache memory.

10. The storage control device according to claim 9, wherein:

said first information processing device is an open information processing device; and said second information processing device is a mainframe information processing device.

* * * * *